United States Patent [19]

Buhrer

[11] Patent Number: 4,988,170

[45] Date of Patent: Jan. 29, 1991

[54] QUASI-ACHROMATIC OPTICAL ISOLATORS AND CIRCULATORS

[75] Inventor: Carl F. Buhrer, Framingham, Mass.

[73] Assignee: GTE Laboratories Incorporated, Waltham, Mass.

[21] Appl. No.: 331,428

[22] Filed: Mar. 31, 1989

[51] Int. Cl.$^5$ .......................... G02F 1/09; G02B 5/30; G02B 27/28

[52] U.S. Cl. .................................. 350/377; 350/403; 350/405

[58] Field of Search .............. 350/403, 375, 374, 394, 350/400, 401, 402, 370, 395, 170, 377, 405; 372/703

[56] References Cited

U.S. PATENT DOCUMENTS

| | | | |
|---|---|---|---|
| 3,558,215 | 1/1971 | De Lang et al. | 350/377 X |
| 4,650,289 | 3/1987 | Kuwahara | 350/375 |
| 4,671,613 | 6/1987 | Buhrer | 350/174 |
| 4,702,557 | 10/1987 | Beckmann et al. | 350/330 |
| 4,756,607 | 7/1988 | Watanabe et al. | 350/375 |
| 4,762,384 | 8/1988 | Hegarty et al. | 350/96.12 |
| 4,770,050 | 9/1988 | Okazaki | 350/377 |

OTHER PUBLICATIONS

H. Iwamura, S. Hayashi & H. Iwasaki, "A Compact Optical Isolator Using a YIG Crystal for Near Infra-Red Radiation," *Optical and Quantum Electronics*, vol. 10, pp. 393–398 (1978).

A. Shibukawa & M. Kobayashi, "Compact Optical Circulator for Near-Infrared Region," *Electron. Lett.*, vol. 14, No. 25, pp. 816–817 (1978).

T. Matsumoto, "Polarisation-Independent Optical Circulator Coupled with Multi-Mode Fibres," *Electron Lett.*, vol. 16, No. 1, pp. 8–9 (1980).

M. Shirasaki & T. Obokata, "Compact Polarization-Independent Optical Circulator," *Appl. Opt.*, vol. 20, No. 15, pp. 2683–2687 (1981).

W. L. Emkey, "Polarization-Independent Optical Circulator for 1.3 μm," *J. Lightwave Tech.*, vol. LT-1, No. 3, pp. 466–469 (1983).

M. Shirasaki & K. Asama, "Compact Optical Isolator for Fibers Using Birefrigent Wedges," *Appl. Opt.*, vol. 21, No. 23, pp. 4296–4299 (1982).

S. Matsumoto & S. Suzuki, "Temperature-Stable Faraday Rotator Material and Its Use in High-Performance Optical Isolators," *Appl. Opt., vol. 25, No. 12 (Jun. 1986)*.

M. G. Destriau, and M. J. Prouteau, "Realisation d'un quart d'onde Quasi Acliromatique Par Juxtaposition de Deux Lames Crystallines de Meme Nature," *Le Journal de Physique et le Radium.*, Serie VIII, Tome X (Fevrier 1949).

R. C. Jones, "A New Calculus for the Tretment of Optical Systems I–Description and Discussion of the Calculus," *J. Opt. Soc. Amer.*, vol. 31, pp. 488–493 (1941).

(List continued on next page.)

*Primary Examiner*—Bruce Y. Arnold
*Assistant Examiner*—David R. Parsons
*Attorney, Agent, or Firm*—Victor F. Lohmann, III; James J. Cannon, Jr.

[57] ABSTRACT

A quasi-achromatic configuration of two Faraday elements and five birefringent plates which when suitably oriented between two linearly polarizing elements would constitute an optical isolator or circulator. The nominal Faraday rotations of the two elements are 45° and 90° at a center design wavelength about which the devices are to operate. Changes in these rotations due to either wavelength or temperature variations compensate one another because of their coupling by the birefringent plates. In this way a higher degree of isolation is obtained over a wider optical bandwidth than would be possible in a device using a single 45° Faraday element. A group of three plates is used between the two Faraday elements and two more follow them to give the required polarization transformations which must themselves be quasi-achromatic over the desired wavelength range.

45 Claims, 10 Drawing Sheets

OTHER PUBLICATIONS

S. E. Harris, E. O. Ammann & I. C. Chang, "Optical Network Synthesis Using Birefringent Crystals Synthesis of Lossless Networks of Equal Length Crystals," *J. Optical Soc. Amer.*, vol. 54, No. 10, pp. 1267-1279 (1964).

C. S. Hurlbut, Jr., & J. L. Rosenfeld, "Monochromator Utilizing the Rotary Power of Quartz," *Amer. Minerol.*, vol. 7, pp. 158-165 (1952).

J. W. Evans, "Solc Birefringent Filter," *J. Opt. Soc. Amer.*, vol. 48, p. 142 (1958).

A. Ghosh & A. K. Chakraborty, "A Mixed Sole Birefringent Filter," *Optica Acta*, vol. 29, No. 10, pp. 1407-1412 (1982).

C. M. McIntyre & S. E. Harris, "Achromatic Wave Plates for the Visible Spectrum," *J. Optical Soc. Amer.*, vol. 58, No. 12, pp. 1575-1580 (1968).

M. Shiraski, H. Nakajima, K. Asama, "Compact Optical Isolator for Fibers Suitable for Operating in the 1.3 1.5 $\mu$m Wavelength Region." Digest of Conference on Lasers & Electro-Optics, (Optical Society of America, Wash. DC 1983), paper THA2.

C F. Burhrer, "Wideband Temperature-Compensated Optical Isolator or Circulator Configuration Using Two Faraday Elements," Optics Letters, vol. 14, No. 210, Nov. 1989.

Cascaded Optical Isolator Configuration Having High-Isolation Characteristics Over a Wide Temperature and Wavelength Range, Shiraishi and Kawakami, Optics Letters/vol. 12, No. 7, Jul. 1987.

Compact Polarization-Independent Optical Circulator, Shirasaki, Kuwahara and Obokata, Applied Optics, vol. 20, No. 15, Aug. 1, 1981, pp. 2683-2687.

QUASI-ACHROMATIC OPTICAL ISOLATORS AND CIRCULATORS

BACKGROUND OF THE INVENTION

This invention pertains to nonreciprocal optical devices such as optical isolators and optical circulators constructed from materials that exhibit the optical Faraday effect. Optical isolators are commonly used to overcome the instability in semiconductor light sources caused by reflected light. Optical circulators may be used in two way optical fiber communication systems and in other applications. In particular, the invention pertains to quasi-achromatic optical isolators and circulators.

Nonreciprocal optical devices such as isolators and circulators may be constructed from materials that exhibit the optical Faraday effect. This effect is a circular birefringence that arises from the presence within the material of a magnetization resulting from an externally applied magnetic field or from an internal spontaneous magnetization due to ferromagnetic or ferrimagnetic ordering that may be held in a saturated state by an externally applied magnetic field. In either case it manifests itself as an optical rotatory effect upon light propagating through the material along the direction of magnetization. It is nonreciprocal in that the sense of rotation of the axes of polarization depends on the polarity of the magnetization relative to the direction of propagation.

Optical signals transmitted through fiber optic waveguides are being used for telecommunications to an ever increasing extent. They are generated by laser diodes of various types that often operate at wavelengths in the 1.28 to 1.60 μm range. Some of these lasers, especially those of the so-called distributed feedback construction are somewhat sensitive to light returning on their output fiber, whether it be from reflections of their own emissions or from another source. An optical isolator which is a nonreciprocal two-port device that passes light in one direction and absorbs light in the opposite direction, is often necessary to obtain optimum operation from these laser diode sources.

The optical circulator is a more generally applicable nonreciprocal four-port device. As with the isolator light entering the first port passes out the second port, but light entering the second port is not absorbed, and instead passes out the third port. Similarly, light entering the third port passes out the fourth port, and light entering the fourth port passes out the first port. Thus by using any two adjacent ports, a circulator can function as an isolator, but it also has the potential of permitting optical fiber transmission lines to be operated in a bidirectional mode with signals at the same wavelength traveling in opposite directions simultaneously.

Basic to the operation of both optical isolators and circulators is the 45 degree Faraday rotation element which is usually composed of glass or a single crystal transparent over the desired wavelength range. Opposing parallel optical facets surround the active region which is within an externally applied axial magnetic field provided by adjacent permanent magnets or by a current carrying solenoid. The field strength required to obtain 45 degrees of rotation depends on the Verdet constant of the element material. Suitable materials include diamagnetic glasses especially those with a high lead oxide content, paramagnetic glasses or cubic crystals containing ions such as trivalent cerium or terbium, and ferrimagnetic oxide crystals such as yttrium iron garnet. The latter, commonly known as YIG, is especially useful in the 1.28 to 1.60 μm wavelength range where many optical fiber systems operate.

In its simplest form an optical isolator consists of an input plane polarizer, a 45 degree Faraday element with its associated axial field magnet and an output plane polarizer with its polarization axis rotationally orientated at 45 degrees relative to that of the input polarizer. A compact isolator of this type using a YIG crystal has been described in the prior art. Input light must be plane polarized to pass through the input polarizer after which its plane of polarization is rotated 45 degrees by the Faraday element so that it can pass through the output polarizer. If the propagation direction is reversed the Faraday element will rotate −45 degrees and the light passed through it will be absorbed in the output polarizer. A similar optical circulator, also using a YIG crystal, but with input and output polarizing beam splitters instead of plane polarizers has also been described. But both devices require specific states of plane polarization at their ports to function optimally.

An isolator used immediately adjacent to a laser diode transmitter can accept its plane polarized output, but if isolators or circulators are to be generally applicable in optical fiber systems they must function with any polarization state at their ports. Polarization independent circulators have been built which use the same polarizing beam splitters to separate the two orthogonal components of any arbitrary input state so that they may be processed in parallel in the Faraday nonreciprocal element. A simpler birefringent wedge polarization splitter has been used to construct a polarization insensitive isolator, but it does not appear to be applicable to circulators.

The degree of isolation obtainable with either of these nonreciprocal devices is limited by deviations of the Faraday element rotation from its nominal 45 degrees. The element is designed for some nominal wavelength and in general it will have a greater rotation at shorter and a lesser rotation at longer wavelengths. Also, some Faraday elements such as YIG are temperature sensitive so the rotation will change due to temperature variations. Various techniques have been used to improve the degree of isolation by minimizing these deviations from 45 degree rotation In the case of YIG, gadolinium substitution for part of the yttrium lowers the temperature coefficient of the rotation, but at the expense of its magnitude. The wavelength dependence can be partially compensated by a second element having −45 degrees of reciprocal type rotation. Such an element can be made from an optically active crystal. The two element combination between crossed polarizers would be used as an isolator. For one direction of propagation the opposite rotations would always sum to zero if they had identical wavelength dependences. But for the opposite direction of propagation both elements would have −45 degrees of rotation which would sum to −90 degrees with a doubled wavelength variation. The isolator would therefore have a wavelength dependent insertion loss. The two element combination could not be used at all in an optical circulator because isolation between all four adjacent ports could not be achieved.

The basic optical isolator of the prior art is shown in FIG. 1. An input light beam 12 propagates along the +z axis in a right-hand coordinate system and passes in turn through plane polarizer 14. Faraday rotation element 15, and output plane polarizer 18. Beam 12 is plane polarized at an angle of zero degrees to the x axis and passes through polarizer 14 unchanged. Within Faraday rotation element 15 which includes its axial field producing magnet, the plane of polarization is rotated to an angle of +45 degrees from the x axis. Output polarizer 18 is oriented at +45 degrees to pass beam 12 undiminished in intensity. A reverse direction beam would initially be polarized at +45 degrees so as to pass through polarizer 18 unchanged. Within Faraday rotation element 15 its polarization direction would be rotated to an angle of +90 degrees so that it would be completely absorbed by polarizer 14. Thus the device functions as an isolator because it transmits light propagating in the +z direction and absorbs light propagating in the −z direction.

A rotator element is considered to have a positive rotation if the polarization axes rotate in a counter-clockwise direction as the oncoming light beam is observed. In the above description of a simple optical isolator, the polarization axes were rotated from x toward y for both propagation directions, but according to the above definition this corresponds to a +45 degree rotation for the +z direction and a −45 degree rotation for the −z direction. This is the nonreciprocal behavior of the Faraday effect. A reciprocal rotation element on the other hand has the same polarity of rotation for both propagation directions. Light propagating in an optically active element for example, would have its polarization axes rotated, but if the direction were reversed the polarization axes would retrace the orientations traced during their forward path.

In the prior art optical isolator shown in FIG. 2, these two types of rotations are used together to partially compensate for the wavelength dependence of the Faraday effect. It also requires input beam 22 to be plane polarized at an angle of zero degrees to the x axis so that it passes through plane polarizer 24 unchanged. Within Faraday rotation element 25 which includes its axial field producing magnet, the plane of polarization is rotated to an angle of +45 degrees from x axis. Within +45 degree reciprocal rotation element 27 the plane of polarization is rotated to +90 degrees from the x axis. Output polarizer 28 is oriented at +90 degrees to pass beam 22 undiminished in intensity. A reverse direction beam would initially be polarized at +90 degrees so as to pass through polarizer 28 unchanged. After passing back through the reciprocal rotation element 27 the plane of polarization would again be at +45 degrees from the x axis, but after passing back through Faraday rotation element 25, it would be rotated to an angle of +90 degrees so that it would be completely absorbed by polarizer 24. Thus this device also functions as an isolator. The purpose of the additional +45 degree reciprocal rotation element is to add the wavelength dependence of its +45 degree rotation to that of the −45 degree Faraday rotation acting upon the reverse direction beam, thereby at least partially compensating the device for operation with an improved degree of isolation over some wavelength range. But in the forward direction these wavelength dependences add and cause some wavelength dependent degree of misalignment between the plane of polarization and the orientation of output polarizer 28. This leads to a wavelength dependent insertion loss.

SUMMARY OF THE INVENTION

A principal object of the present invention is to provide a quasi-achromatic optical isolator, that is, one operable over an optical wavelength band with a substantially improved degree of isolation compared to that of an optical isolator constructed according to the prior art.

Another object is to provide an optical isolator that compensates for changes in the rotation of its Faraday elements due to either wavelength or temperature variations.

Still another object is to provide an optical isolator that compensates for changes in the optical retardation of all of its birefringent elements due to either wavelength or temperature changes.

A second principal object of the invention is to provide a quasi-achromatic optical circulator, that is, one operable over an optical wavelength band with a substantially improved degree of isolation compared to that of an optical circulator constructed according to the prior art.

Another object is to provide an optical circulator that compensates for changes in the rotation of its Faraday elements due to either wavelength or temperature variations.

Yet another object is to provide an optical circulator that compensates for changes in the optical retardation of all of its birefringent elements due to either wavelength or temperature changes.

These and other objects of the invention are achieved in that deviations of the rotation of the Faraday element from 45 degrees resulting from wavelength changes or from temperature variations are compensated for by a second Faraday rotation element composed of the same material. This compensation is more effective than in the prior art device of FIG. 2 because the rotations of the two Faraday elements have exactly proportional wavelength and temperature dependencies. Also, because the polarities of both Faraday elements change sign together, the compensation is equally effective for both directions of propagation.

This invention pertains to nonreciprocal optical devices having at least two ports between which a light beam may propagate. Adjacent to each port is a polarization filtering means, between each set of which there are at least two nonreciprocal optical rotators positioned alternately with at least two polarization converting means, all designed to operate at a nominal wavelength.

In a first aspect of the invention, a quasi-achromatic optical isolator consists of a sequence having a first plane polarizer, a first Faraday rotator a first linearly birefringent plate, a second Faraday rotator, a second linearly birefringent plate and a second plane polarizer, such that light passing from a first port to a second port passes through said isolator undiminished in intensity, whereas light passing in the opposite direction from the second port to the first port is absorbed by the first plane polarizer.

In a second aspect of the invention, the second Faraday rotator has double the rotation of the first and it is in the opposite direction from that of the first Faraday rotator. The linearly birefringent plates have different degrees of retardation which compensate for the differing direction of rotation.

In a third aspect of the invention, the linearly birefringent plates are quasi-achromatic plates and they are optimized for two wavelengths symmetrically displaced from their nominal wavelength.

In a fourth aspect of the invention, a quasi-achromatic optical circulator has four-ports a first beam splitting prism adjacent to the first and third ports, a second beam splitting prism adjacent to the second and fourth ports, and alternating sequentially between said prisms at least two nonreciprocal optical rotators and at least two quasi-achromatic combination plates such that light entering one port passes through said circulator and exits the next succeeding port.

In all aspects of the invention the two nonreciprocal optical rotators exhibit the Faraday effect, one is twice as large as the other and both are made of the same material. The optical rotators and birefringent plates are designed to a nominal wavelength and optimally adjusted for two wavelengths symmetrically displaced from said nominal wavelength.

In this way isolator and circulator devices may be constructed that are relatively insensitive to temperature variations and which can operate over a wider wavelength range with a higher degree of isolation than can devices constructed according to the prior art. The compensation technique of the present invention for Faraday rotation elements is an adaptation of that used to construct a quasi-achromatic quarter-wave plate.

DESCRIPTION OF THE PREFERRED EMBODIMENTS

This invention pertains to nonreciprocal optical devices such as optical isolators and optical circulators constructed from materials that exhibit the optical Faraday effect. Optical isolators are commonly used to overcome the instability in semiconductor light sources caused by reflected light. Optical circulators may be used in two-way optical fiber communication systems and in other applications. In particular, it pertains to quasi-achromatic optical isolators and circulators.

Figure 2:
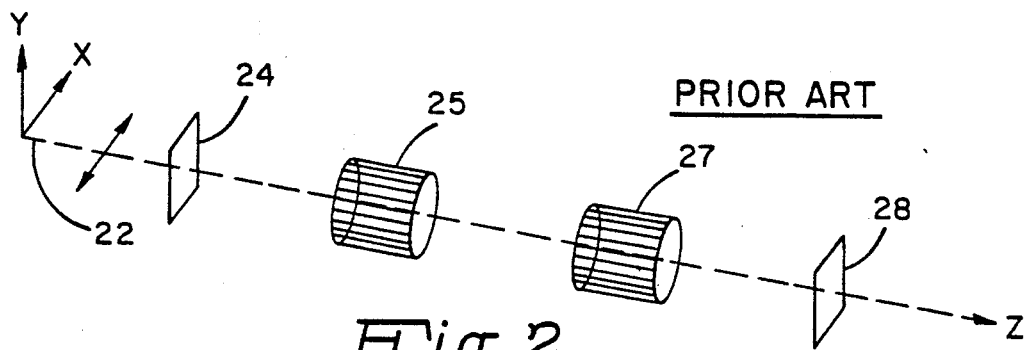
FIG. 2 is an exploded perspective view of a second optical isolator of the prior art.

In the present invention deviations of the rotation of the Faraday element from 45 degrees resulting from wavelength changes or from temperature variations are compensated for by a second Faraday rotation element composed of the same material. The compensation is more effective than in the device of FIG. 2 because the rotations of the two Faraday elements have exactly proportional wavelength and temperature dependencies. Also, because the polarities of both Faraday elements change sign together, the compensation is equally effective for both directions of propagation. In this way isolator and circulator devices may be constructed that are relatively insensitive to temperature variations and which can operate over a wider wavelength range with a higher degree of isolation than can devices constructed according the prior art. The compensation technique of the present invention for Faraday rotation elements is an adaptation of that used to construct a quasi-achromatic quarter-wave plate.

Destriau and Prouteau have shown how two successive polarization transformations by optical retardation plates composed of the same material could achieve quasi-achromatic conversion between linear and circular polarization. They used the Poincare sphere representation of polarization states to show the condition under which proportional changes in the magnitudes of the retardation in each of two sequential linearly birefringent plates could compensate leaving the net polarization transformation invariant. These proportional changes were due to the inverse relationship between the optical retardations and wavelength, but changes due to temperature variations for example, would also be compensated.

On the Poincare sphere equatorial points represent linear polarization states with the optical electric field orientation varying from 0 to 180 degrees. The north and south poles represent right and left circular polarization states respectively, while all other points represent states of elliptical polarization. The utility of this Poincare sphere representation results from the fact that a polarization transformation produced by a birefringent element is represented by a circular path around an axis representing the principal polarization mode of the element. Linearly birefringent plates for example, produce polarization transformations represented on the sphere by circular arcs around equatorial axes, while circularly birefringent elements such as reciprocal or nonreciprocal rotators produce polarization transformation represented on the sphere by circular arcs around the polar axis.

The two step transformation found by Destriau and Prouteau was a 90 degree arc from the pole to the equator, followed by a direction reversal along a tangent 180 degree arc back toward the same pole, but ending on the equator at a different point. The two arcs represented transformations by sequential quarter-wave and half-wave plates oriented with their fast axes 60 degrees apart such that the two arc lengths were equal and their radii were in a 2:1 ratio. This two step transformation of circular polarization to linear polarization is insensitive to proportional changes in the retardations of the two elements because at the direction reversal between steps the equal length arcs are tangent. If both increase or decrease in length by equal amounts the reversal point moves off the equator, but their opposite ends representing the net polarization transformation remain invariant.

Since the polarization transformations of the two Faraday rotation elements of the present invention are represented by arcs around the polar axis, the latter cannot be tangent. Compensation must involve additional linearly birefringent elements and they themselves must compensate one another for proportional changes due to temperature and wavelength variations if the total optical system is to be quasi-achromatic.

Figure 3:
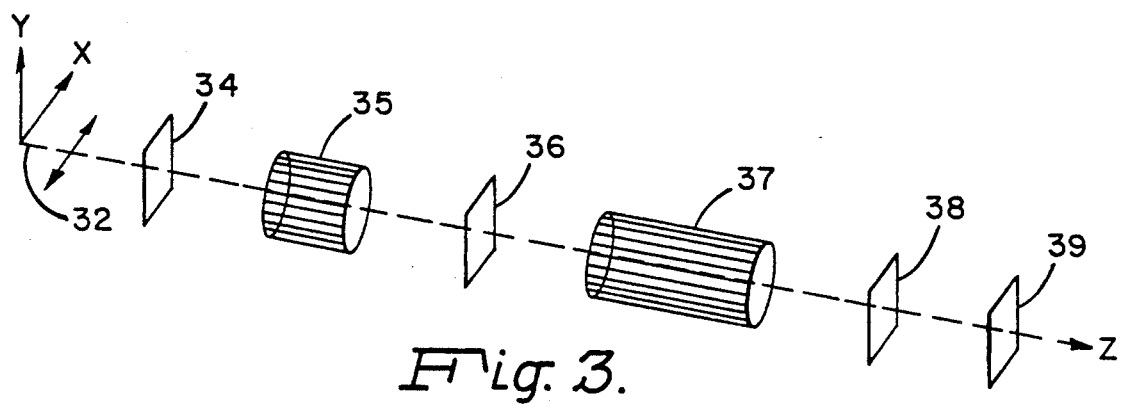
FIG. 3 is an exploded perspective view of a first embodiment of the optical isolator according to the present invention.

An optical isolator constructed according to the present invention is shown in FIG. 3. Input light beam 32 propagates along the +z axis in a right-hand coordinate system and passes in turn through plane polarizer 34, Faraday rotation element 35, linearly birefringent plate 36, Faraday rotation element 37, linearly birefringent plate 38 and output plane polarizer 39. Beam 32 is plane polarized at an angle of zero degrees to the x axis and passes through polarizer 34 unchanged. Within Faraday rotation element 35 which includes its axial field producing magnet, the plane of polarization is rotated to an angle of +45 degrees from the x axis. The second Faraday rotation element 37 which also includes its axial field producing magnet has a rotation angle of +90 degrees. Both plates 36 and 38 have +120 degrees of retardation with their fast axes oriented at +90 degrees from the x axis. Output polarizer 39 is oriented at +135 degrees from the x axis. The polarization transformations that take place in elements 35, 36, 37, and 38 are represented on the Poincare sphere diagram of FIG. 4a in terms of the spherical coordinates $2\Psi$ and $2\chi$ where $\Psi$ is the orientation of the major elliptic axis and $\chi$ is the ellipticity. The latter is the arc tangent of the elliptic axis ratio and is 45 degrees for circularly polarized light.

Figure 4A:
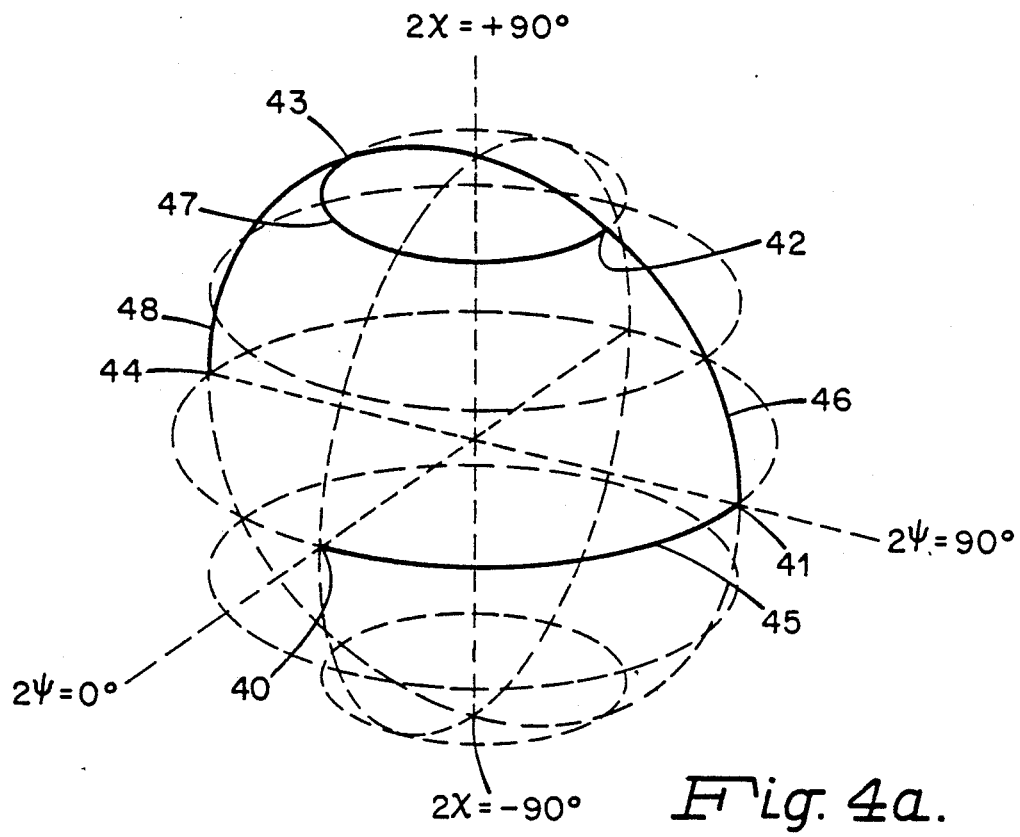
FIGS. 4a and 4b represent on Poincare sphere diagrams the polarization transformations that take place in the elements of the optical isolator of FIG. 3.

The +90 degree arc 45 of FIG. 4a represents the +45 degree Faraday rotation by element 35 from the input linear polarization state 40 at $2\Psi=0$, $2\chi=0$ to the linear state 41 represented by the point $2\Psi=+90$, $2\chi=0$. The +120 degree arc 46 across the north pole represents the transformation by plate 36 to the elliptical state 43 at $2\Psi=+270$, $2\chi=+60$. The +180 degree arc 47 represents the +90 degree Faraday rotation by element 37 to the elliptical state 42 at $2\Psi=+90$, $2\chi=+60$. The +120 degree arc 48 also across the north pole represents the transformation by plate 38 to the linear polarization state 44 at $2\Psi=+270$, $2\chi=0$. Output polarizer 39 is oriented at +135 degrees to pass beam 32 undiminished in intensity.

Figure 4B:
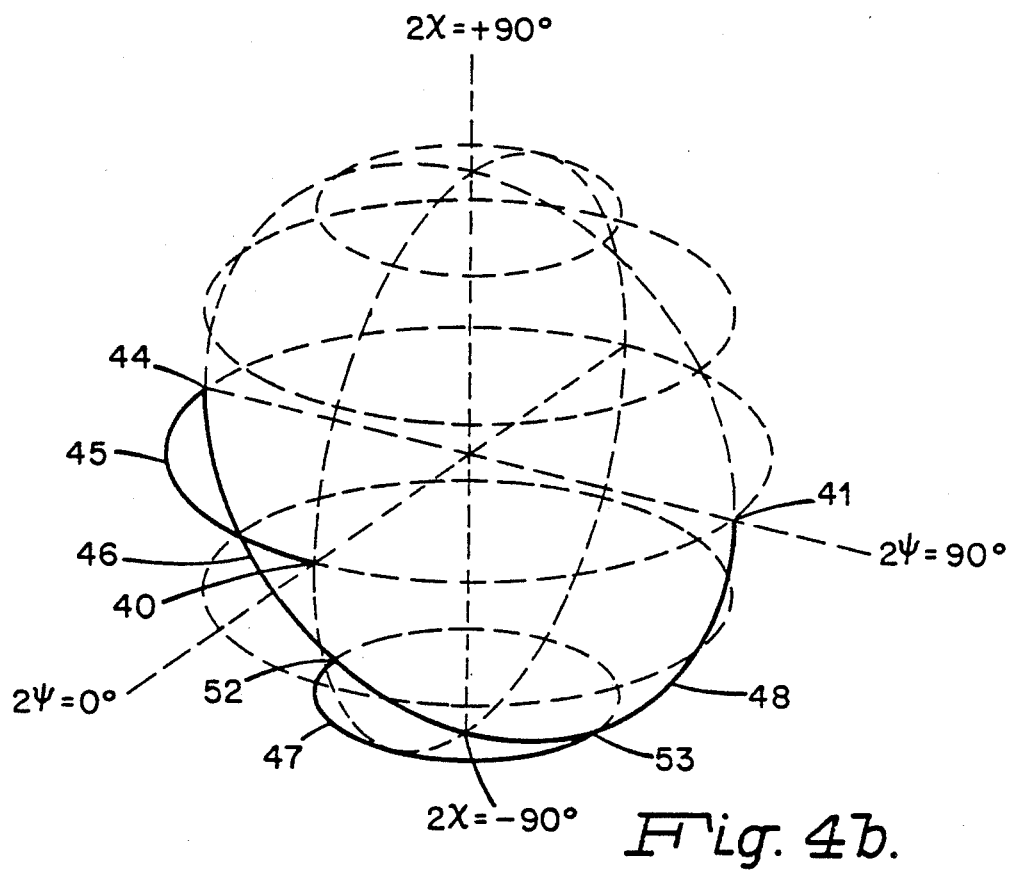

The operation of the isolator of FIG. 3 in the reverse direction is equivalent to reversing the polarity of both Faraday rotators. The polarization transformations are then represented by the Poincare sphere diagram of FIG. 4b. The −90 degree arc 45 represents the −45 degree Faraday rotation in element 35 from the input linear polarization state 40 represented by the point $2\Psi=0$, $2\chi=$ to the linear state 44 represented by the point $2\Psi=+270$, $2\chi=0$. The +120 degree arc 46 across the south pole represents the transformation in plate 36 to the elliptical state 53 at $2\Psi=+90$, $2\chi=-60$. The −180 degree arc 47 represents the −90 degree Faraday rotation in element 37 to the elliptical state 52 at $2\Psi=+270$, $2\chi=-60$. The +120 degree arc 48 also across the south pole represents the transformation in plate 38 to the linear polarization state 41 at $2\Psi=+90$, $2\chi=0$. Output polarizer 39 oriented at +135 degrees completely absorbs beam 32.

Figure 5:
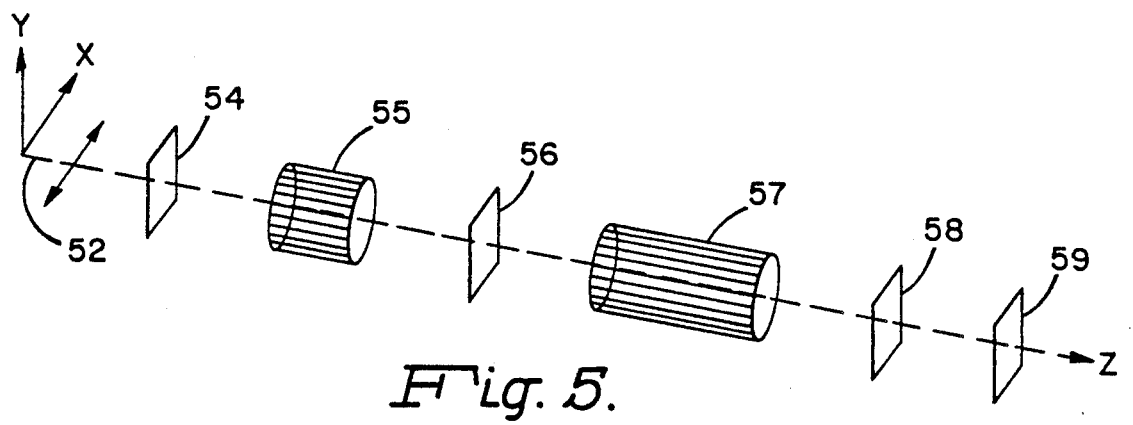
FIG. 5 is an exploded perspective view of a second embodiment of the optical isolator of the present invention.
Figure 6A:
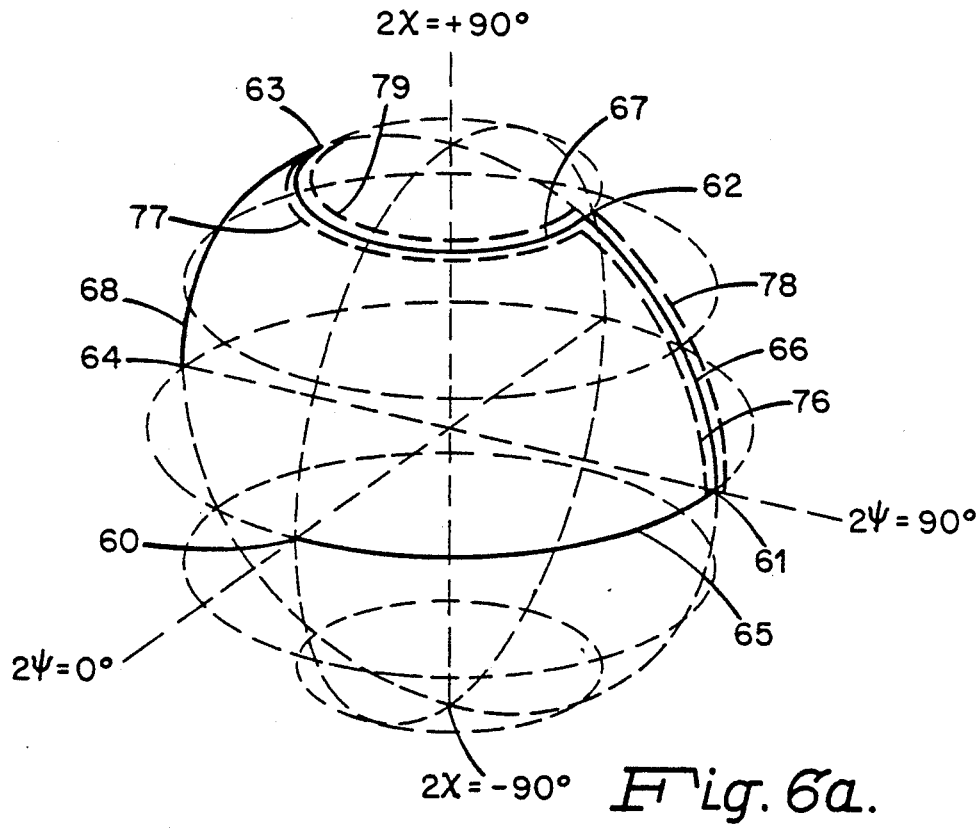
FIGS. 6a and 6b represent the Poincare sphere transformations that take place in the elements of the optical isolator of FIG. 5.
Figure 6B:
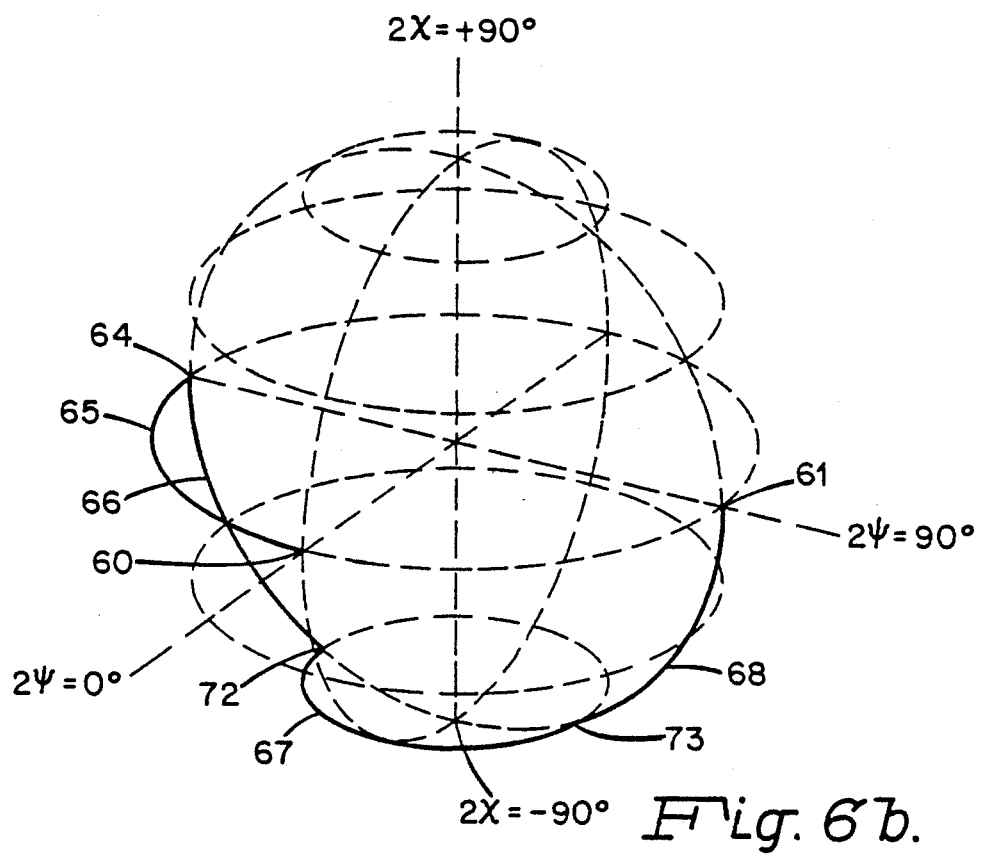

An alternative construction of the isolator is shown in FIG. 5. Input light beam 52 propagates along the +z axis in a right-hand coordinate system and passes in turn through plane polarizer 54, Faraday rotation element 55, linearly birefringent plate 56 Faraday rotation element 57, linearly birefringent plate 58 and output plane polarizer 59. Beam 52 is plane polarized at an angle of zero degrees to the x axis and passes through polarizer 54 unchanged. But Faraday rotation elements 55 and 57 have rotations of +45 and −90 degrees respectively obtained by reversing the axial field magnet associated with element 57 and plates 56 and 58 have retardations of +60 degrees with their fast axes oriented at +90 degrees from the x axis. The corresponding Poincare sphere transformations are shown in FIGS. 6a and 6b. These are somewhat simpler than those of FIGS. 4a and 4b and will now be used to demonstrate how the isolator of FIG. 5 like that of FIG. 3 compensates for proportional changes in both the magnitudes of the Faraday rotations and the retardations of the linearly birefringent plates.

The radii of +90 and −180 degree arcs 65 and 67 of FIG. 6a are proportional to the cosines of their $2\chi$ values which are 0 and 60 degrees respectively. Since the radius of the −180 degree arc is half that of the +90 degree arc, the arc lengths are equal but opposite in sense. If the Faraday rotations that they represent each change by a proportional amount due to wavelength or temperature variations the lengths of arcs 65 and 67 will both change by equal amounts. Arc 65 represents the nominal +45 degree Faraday rotation by element 55 from the input linear polarization state at point 60 to point 61. A change in its length causes the following +60 degree arc 66 which represents the transformation by plate 56 to move to a new position 76 or 78 while remaining centered about an equatorial axis through point 60. Both endpoints of arc 66 move by equal distances, and so the equal change in the length of arc 67 compensates that of arc 65, thereby leaving endpoint 63 or arc 67 representing the −90 degree Faraday rotation by element 57 invariant. Proportional changes in the retardations of plates 56 and 58 due to temperature or wavelength variations will cause the lengths of arcs 66 and 68 to change by equal amounts. These will cause arc 67 to move to a new position 77 or 79, but point 64 representing the linear output polarization state at an angle of +135 degrees from the x axis will remain invariant. Output polarizer 59 is oriented at +135 degrees to pass beam 52 undiminished in intensity.

The operation of the isolator of FIG. 5 in the reverse direction is also equivalent to reversing the polarity of both Faraday rotators. The polarization transformations are then represented by the Poincare sphere diagram of FIG. 6b. The −90 degree arc 65 represents the −45 degree Faraday rotation in element 55 from the input linear polarization state 60 at $2\Psi=0$, $2\chi=0$ to the linear state 64 at $2\Psi=+270$, $2\chi=0$. The +60 degree arc 66 represents the transformation in plate 56 to the elliptical state 72 at $2\Psi=+270$, $2\chi=-60$. The +180 degree arc 67 represents the +90 degree Faraday rotation in element 57 to the elliptical state 73 at $2\Psi=+90$, $2\chi=-60$. The $+60$ degree arc 68 represents the transformation in plate 58 to the linear polarization state 61 at $2\Psi=+90$, $2\chi=0$. Output polarizer 59 oriented at $+135$ degrees completely absorbs beam 52.

The above discussions based on the geometry of the Poincare sphere representations of the isolators of FIGS. 3 and 5 indicate how proportional changes in the rotations of the two Faraday elements and the retardations of the two linearly birefringent plates compensate one another. But the isolators are not completely temperature insensitive nor achromatic because of higher order effects not readily quantified using the Poincare sphere. For this purpose the Jones matrix method of birefringent network analysis is better suited.

Figure 1:
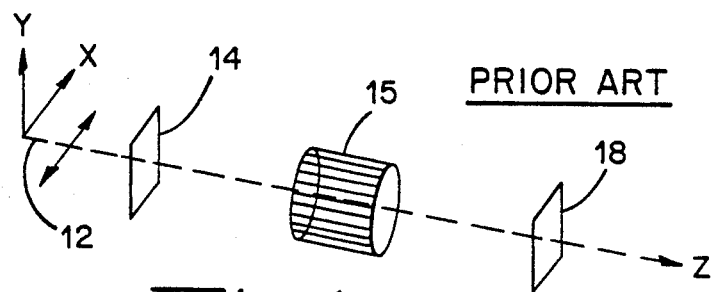
FIG. 1 is an exploded perspective view of the basic optical isolator of the prior art.
Figure 7A:
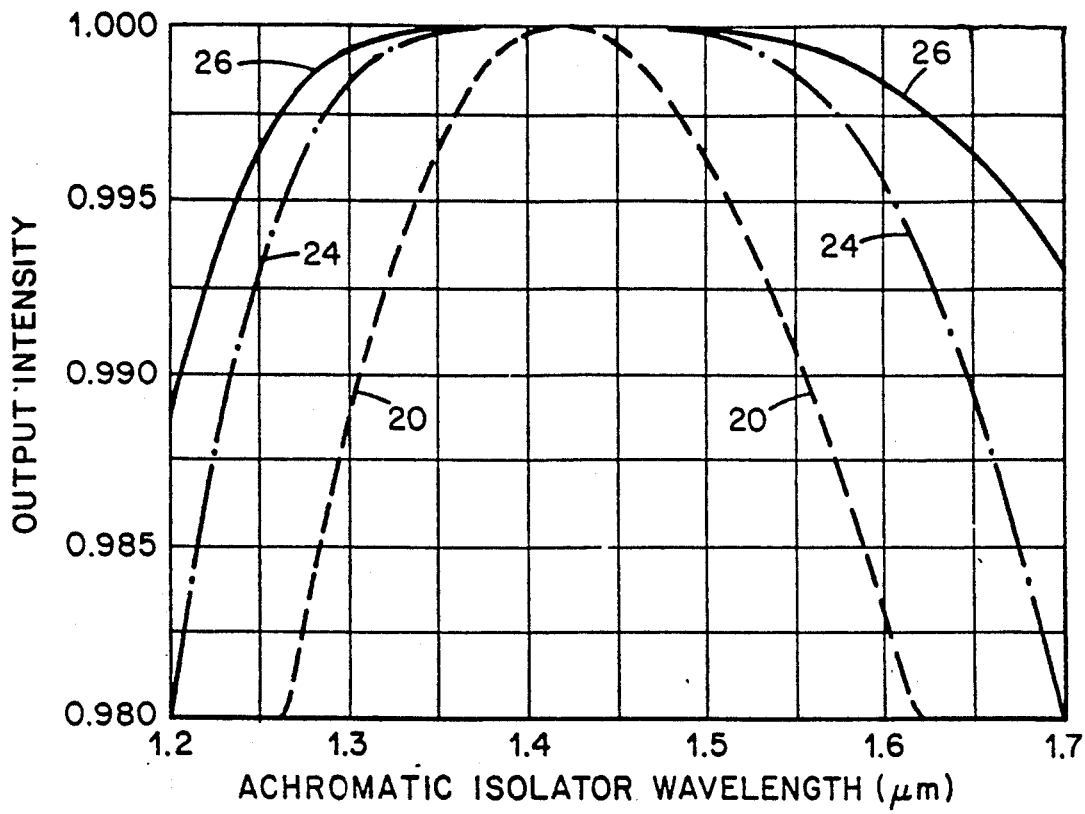
FIGS. 7a and 7b plot the forward and reverse transmissions respectively of the optical isolator configurations of FIGS. 1, 3 and 5.
Figure 7B:
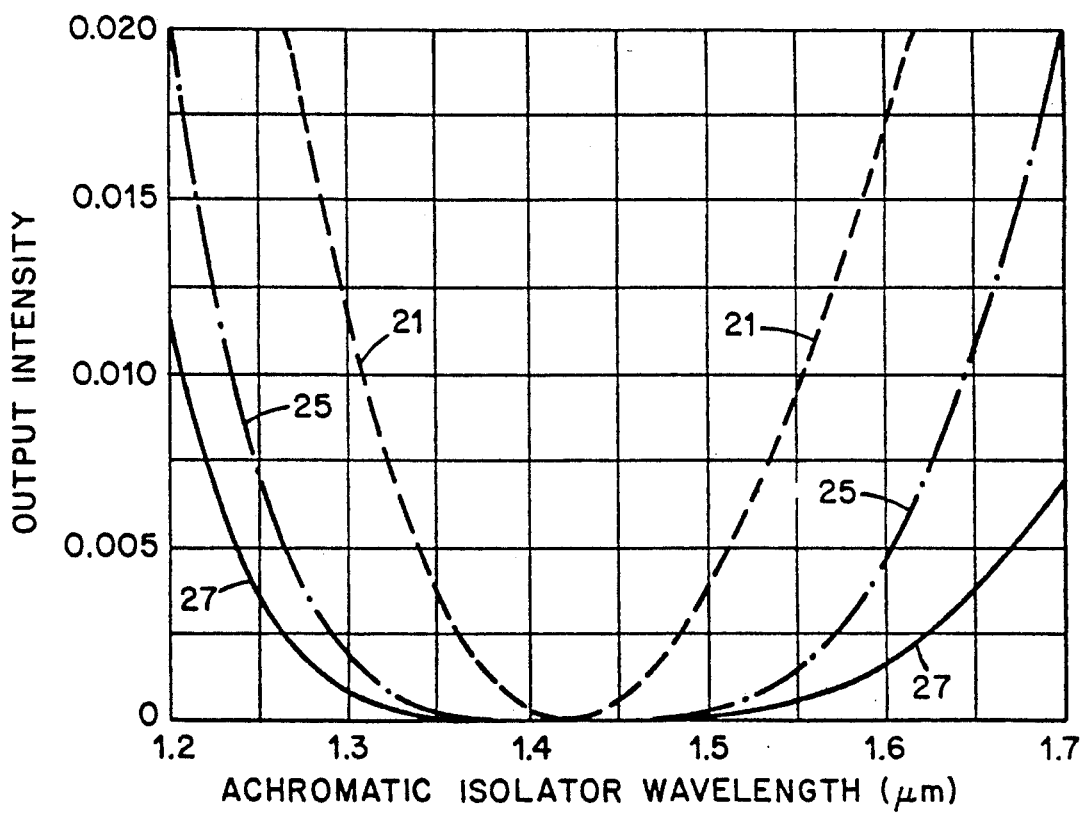

The isolator configurations of FIGS. 1, 3, and 5 were assumed to have been assembled using YIG crystal Faraday rotations elements and quartz birefringent plates both cut for a nominal wavelength of 1.42 $\mu$m. The forward and reverse transmissions of each optical network were computed as a function of wavelength using the known dispersions of the Faraday rotation and the birefringence of quartz. FIG. 7a shows the forward transmission of the prior art isolator of FIG. 1 as curve 20 while curves 24 and 26 show the forward transmissions of the isolator configurations of FIGS. 3 and 5 of the present invention. The latter two transmission functions are quasi-achromatic, that is, they remain essentially flat and equal to unity over an extended wavelength range and are significantly closer to unity that that of the prior art within the 1.28 to 1.60 region of interest. Similarly FIG. 7b shows the reverse transmissions of the same three isolators. These functions determine the degree of optical isolation attainable. Curves 25 and 27 remain below 0.005 within the 1.28 to 1.60 $\mu$m wavelength range and this represents an isolation $-23$ db. Within the same range curve 21 of the prior art reaches 0.02 transmission for an isolation of only $-17$ db.

Figure 8:
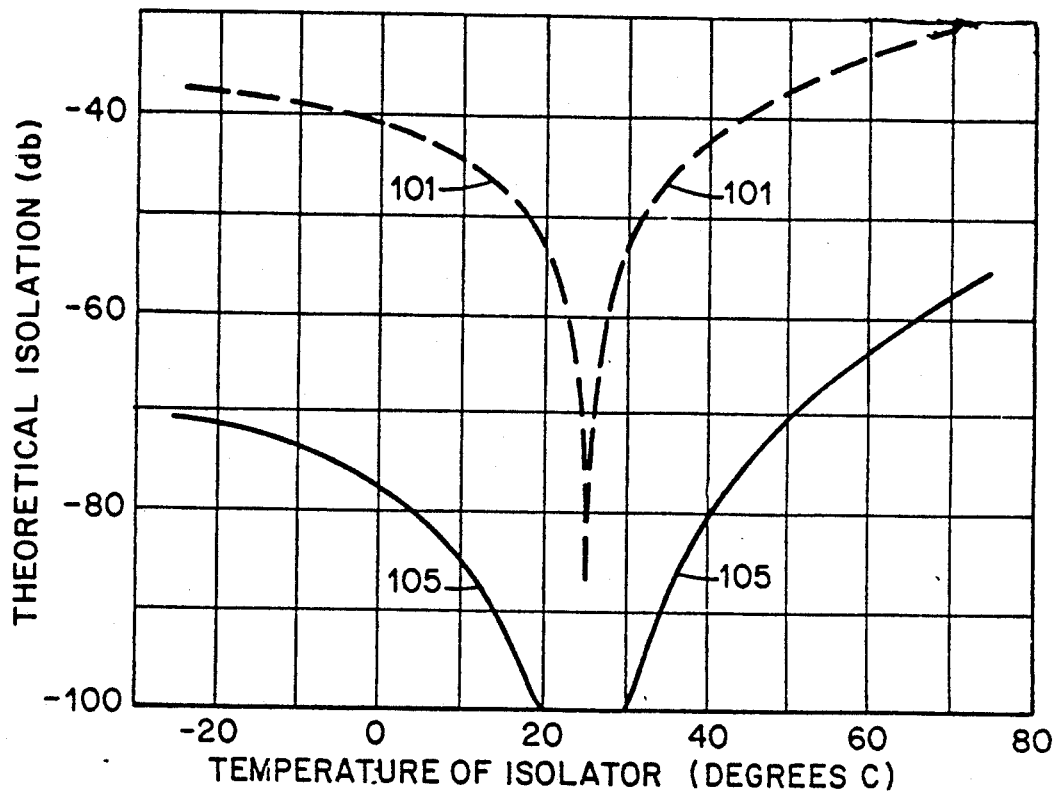
FIG. 8 plots the maximum theoretical isolation at the nominal wavelength as a function of temperature for the optical isolators of FIGS. 1, 3 and 5.

The maximum theoretical isolation at the nominal wavelength was computed as a function of temperature using the published variation with temperature of the Faraday rotation of YIG and assuming that the quartz birefringent plates are stable. As shown in FIG. 8, the isolation achievable with the configuration of either FIG. 3 or 5 and plotted as curve 105 could exceed that of FIG. 1 plotted as curve 101 by 30 db over the 0° to 75° C. range.

In an improved embodiment of the present invention the transmission in the forward direction and the isolation in the reverse direction are optimized at two symmetrically displaced wavelengths at the expense of their values at the nominal wavelength. For example if the Faraday rotators and linearly birefringent elements have their nominal values at 1.42 $\mu$m, it would be desirable to design the isolator for maximum isolation at 1.31 and 1.55 $\mu$m because wavelengths close to these values fall within the so-called transmission windows of optical fibers commonly used in communication systems. To achieve the specific wavelength characteristics desired the techniques of birefringent filter network synthesis are used.

The first birefringent filter invented by Lyot was a sequence of several linear polarizers with a linearly birefringent element between each adjacent pair. Each element had twice the length of the preceding one so that the transmission function was the product of sinusoidal functions with halved periods. The Lyot filter would therefore pass only the single narrow band of wavelengths which was at the maxima of all the sinusoids. Hurlbut et al. constructed a quartz crystal monochromator in a similar way but with reciprocal type circularly birefringent rotation elements between the linear polarizers.

The discovery by Solc that a lossless sequence of equal length linearly birefringent elements between only two linear polarizers could also give a narrow wavelength passband led to the development of birefringent network synthesis by Harris, Ammann and Chang and the generalization of the Solc type filter to give any transmission function. Whereas in the original Solc narrow passband filter, the linearly birefringent elements had their fast axes rotationally oriented at specific angles, in the more general case these angles are determined by synthesis starting from the Fourier components of the desired periodic transmission function. The relative rotational orientation between the fast axes of adjacent linearly birefringent elements is preferably a physical angular orientation, but an alternative is to insert between them optical rotators. Ghosh et al. analyzed the transmission of such a mixed Solc filter and showed that it differs from that of the original Solc filter because in general the optical rotation is wavelength dependent while the physical angular rotation is not.

For the purpose of the present invention the synthesis procedure of Harris Ammann and Chang is now extended to a circularly birefringent network of the generalized Solc type by exchanging the roles of linear and circular birefringence and polarization. Such a filter would resemble the mixed Solc filter, but the circularly birefringent rotators would be the primary wavelength dependent elements, and the linearly birefringent elements would ideally be wavelength independent retardation plates. All would be located between a pair of circular polarizers. The configuration is different from that in the monochromator of Hurlbut which was a circularly birefringent version of the Lyot filter.

Figure 9:
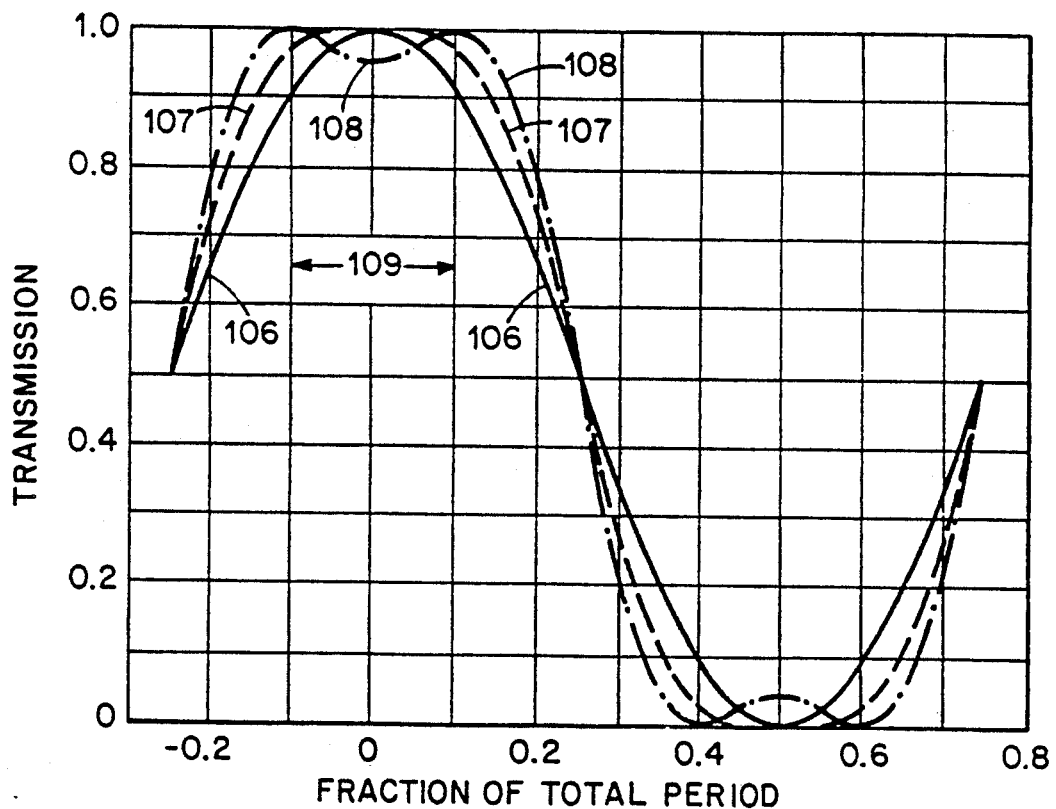
FIG. 9 plots three transmission functions to show the effect of a maximally flat reshaped function.

The relevance of network synthesis to the quasi-achromatic isolator of the present invention lies in the reshaping of a typically sinusoidal transmission function to symmetrically flatten its peaks by adding a third Fourier component. In FIG. 9 is shown a cosine transmission function 106 along with maximally flat function 107 and five percent ripple function 108 all having maxima and minima values of one and zero. Fourier component amplitudes are given in Table I for the case of the maximally flat function 107 and functions similar to 108 but with smaller ripple amplitudes. The peak splitting 109 as a fraction of a full period is also tabulated. Applying the synthesis method of Harris et al. to these Fourier components results in the relative angle $\theta$ values for a three element linearly birefringent filter of the generalized Solc type. These angles are also listed in Table I. Note that in each case the first element has its fast axis rotated $-45$ degrees from that of the input polarizer, while the second and third elements have their fast axes further rotated by approximately $+60$ degrees. The orientation of the output polarizer is approximately $-15$ degrees from the fast axes of the latter element pair which, because of their identical orientations, may be fabricated as a double length element. The data in Table I show that introducing ripple and causing the single peak of the transmission function to split may be accomplished by decreasing the relative angle between the first birefringent element and the subsequent two elements by a few degrees and by simultaneously changing the angle between the output plane polarizer and those latter two elements by half the same amount.

Destriau and Prouteau also showed that if the sequential quarter-wave and half-wave plates of their quasi-achromatic combination plates were oriented with their fast axes slightly less than 60 degrees apart, the required 90 degrees of birefringence needed to convert linear to circular polarization would be obtained at two additional wavelengths symmetrically displaced from the nominal wavelength. Other similar combination plates have been designed using techniques developed for birefringent network synthesis.

The embodiment of the present invention shown in FIG. 3 may be related to a third order circularly birefringent filter by considering Faraday rotator 35 to be the first of its three elements and double length Faraday rotator 37 to be its second and third elements combined. Corresponding to the −45, +60 and −15 degree rotational orientation differences or equivalent optical rotators of the zero ripple linearly birefringent filter of Table I would be linearly birefringent plates with retardations of −90, +120 and −30 degrees this 1:2 ratio of degrees of rotation to degrees of retardation reflecting the fact that a full cycle or rotation is 180 degrees while a full cycle of linear birefringence is 360 degrees. The −90 degree plate is omitted because the desired input polarization is planar rather than circular, the 120 degree plate is plate 36 of FIG. 3, and the −30 degree plate is changed to 120 degree plate 38 to bring the output polarization state to planar.

Adding a small amount of ripple to this isolator transmission function will split its peak and allow it to reach a value of 1.0 at two wavelengths of optimum operation. This may be achieved by decreasing the retardation of plate 36 by a few degrees and by increasing the retardation of plate 38 by half as many degrees. Because of the non-linear variations of the Faraday rotation with wavelength the required changes are best determined by trial and verification by computation. For example, if the retardation of plates 36 and 38 are changed to 118.7 degrees and 120.65 degrees respectively thereby moving arc 47 of FIG. 4a to $2\Psi = 61.3$, and this revised configuration is analyzed using the Jones matrix method of analysis, this proves to be case at 1.31 and 1.55 $\mu$m, but only if the two birefringent plates are assumed to be wavelength independent. If they are not, but have the wavelength dependence of a first order quartz birefringent plate, the isolator transmission functions are essentially the same as those of FIGS. 7a and 7b and lack the desired ripple.

Figure 10:
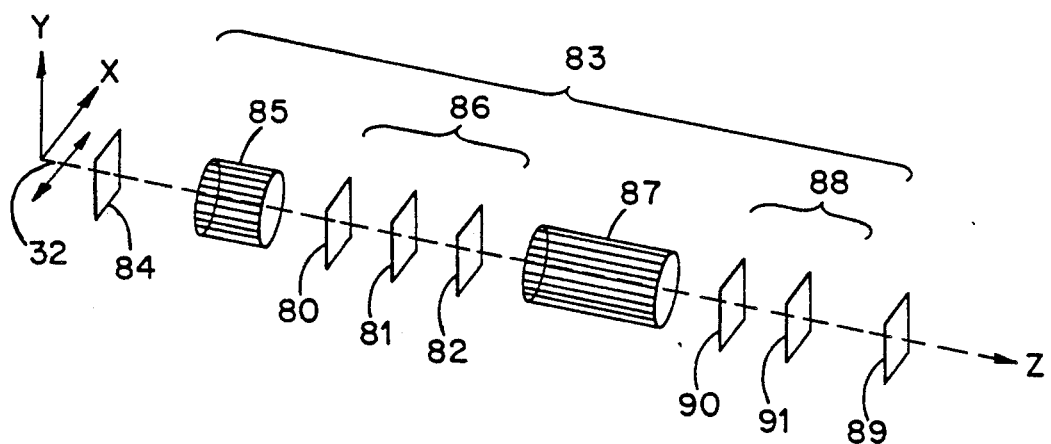
FIG. 10 is an exploded perspective view of the preferred embodiment of a quasi-achromatic optical isolator of the present invention.

In the preferred embodiment of the present invention shown in FIG. 10, plates 36 and 38 of FIG. 3 are replaced by quasi-achromatic combination plates 86 and 88, each optimized at the same wavelengths of 1.31 and 1.55 $\mu$m for which the overall isolator is to be optimized. The first, consisting of first order birefringent plates 80, 81, and 82, transforms plane polarized light to an ellipticity of $2\chi = 61.3$ degrees, while the second, consisting of first order birefringent plates 90 and 91, transforms light with an ellipticity of $2\chi = 59.35$ degrees to linear polarization. Both combination plates perform the required transformations optimally at 1.31 and 1.55 $\mu$m. Input light beam 32 propagates along the +z axis in a right-hand coordinate system and passes in turn through plane polarizer 84. Faraday rotation element 85, combination plate 86 Faraday rotator 87, a second combination plate 88 and output plane polarizer 89. Beam 32 is plane polarized at an angle of zero degrees to the x axis and passes through polarizer 84 unchanged. Faraday rotation elements 85 and 87, both of which include axial field producing magnets have rotations of +45 and +90 degrees respectively, at the nominal wavelength of 1.42 $\mu$m. Output polarizer 89 is oriented at ninety degrees to the x axis.

At the nominal wavelength of 1.42 $\mu$m, light leaving Faraday rotation element 85 has $2\Psi = +90$, $2\chi = 0$, but at 1.31 and 1.55 $\mu$m its linear polarization state is represented on the Poincare sphere by two oppositely displaced points on the $2\chi = 0$ equator. Combination plate 86 produces a three stage polarization transformation of both points to $2\chi = 61.3$ degrees. They retain their spacing but are now oppositely displaced about some $2\Psi$ value required by the design of combination plate 86. They represent the input to Faraday rotation element 87 and the polarity of the latter is chosen to transform the two points to a common output polarization state. Combination plate 88 is designed to transform this common polarization state at the output of Faraday rotator 87 to light polarized at ninety degrees so as to make the isolator configuration of FIG. 10 adaptable to the polarization insensitive configuration of FIGS. 12a and 12b to be described below.

Figure 11A:
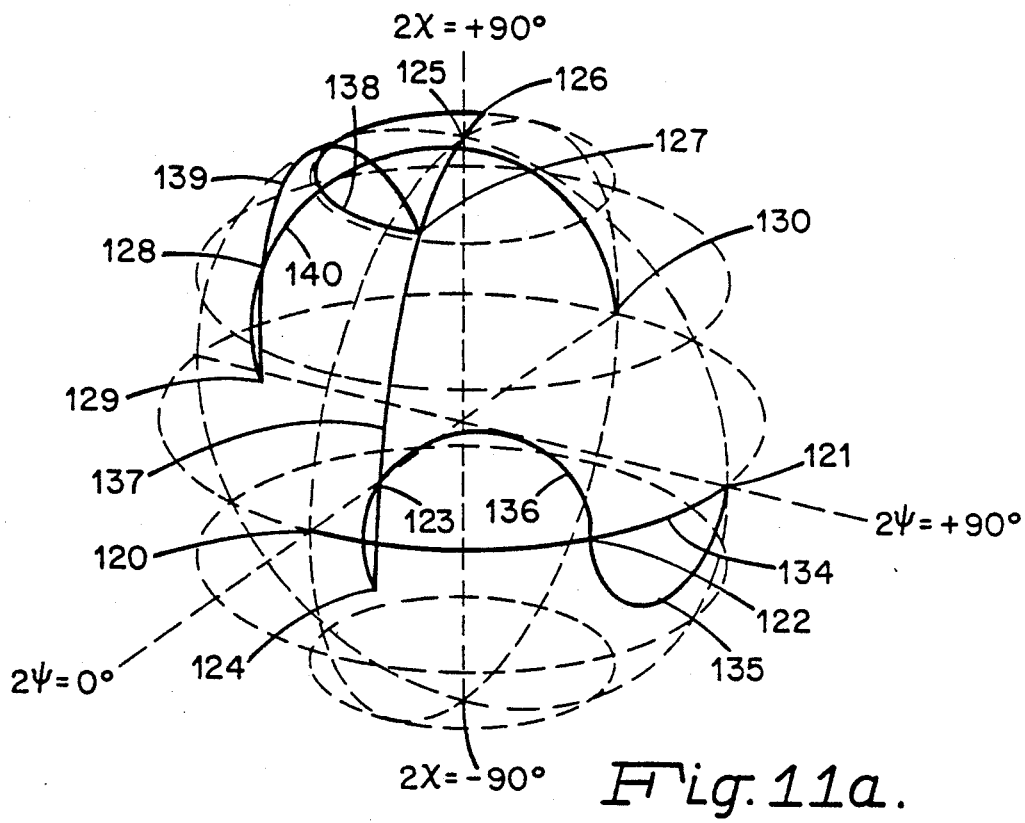
FIGS. 11a, 11b, 11c and 11d are Poincare sphere diagrams representing forward direction transformations of 0 and 90 degree plane polarized input light and reverse direction transformations respectively for the isolator of FIG. 10.
Figure 11B:
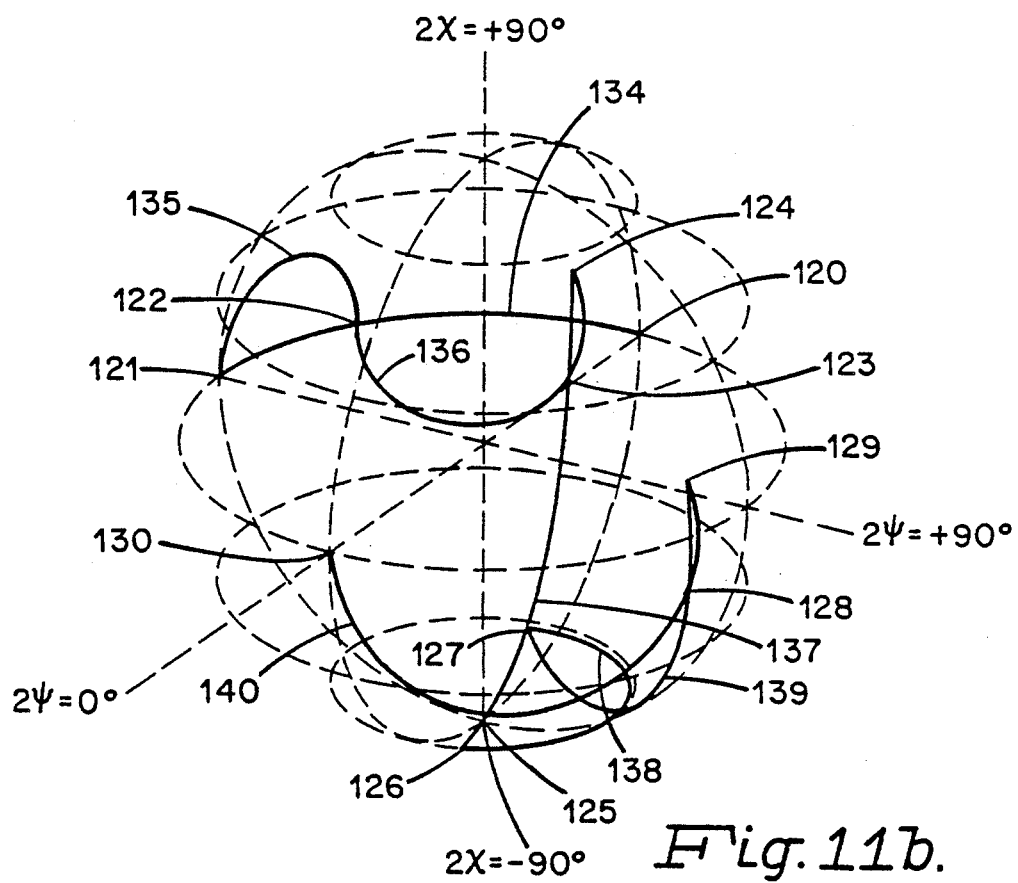
Figure 11C:
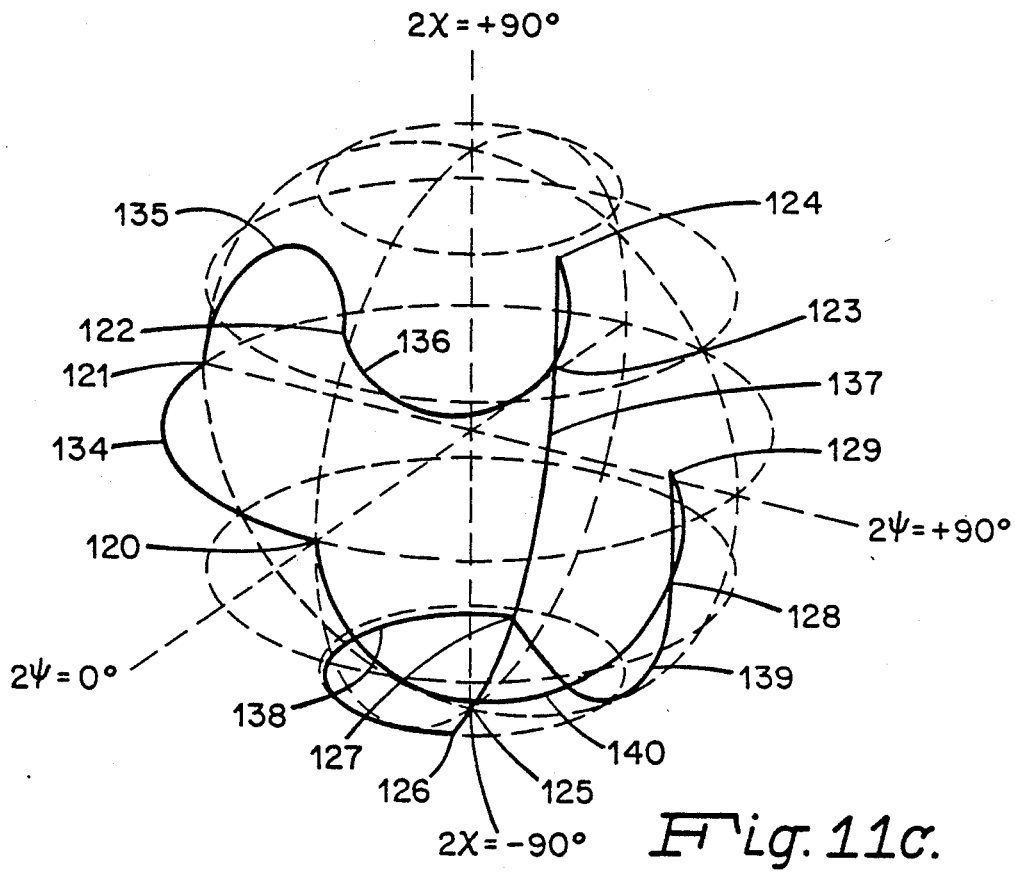
Figure 11D:
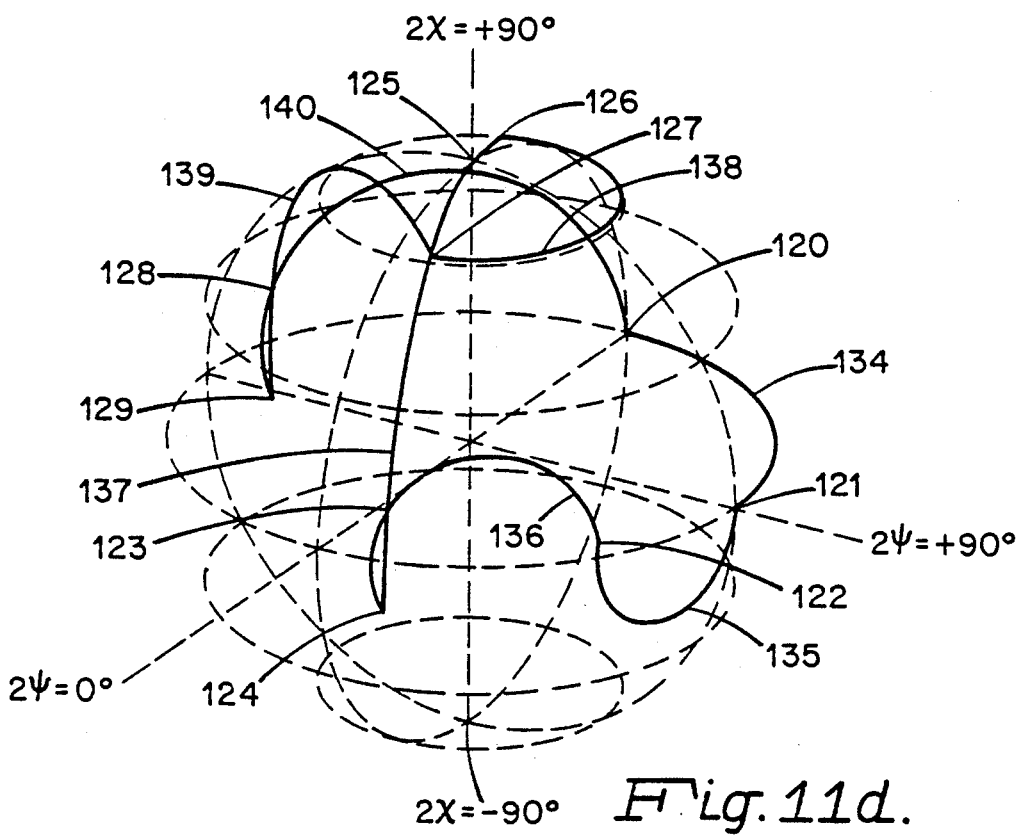

The operation of the isolator of FIG. 10 may be described with the help of the Poincare sphere diagrams of FIGS. 11a and 11b which represent the isolator forward direction transformations of 0 and 90 degree plane polarized input light, respectively, and FIGS. 11c and 11d which represent the corresponding reverse direction transformations. The +90 degree arc 134 of FIG. 11a represents the +45 degree Faraday rotation by element 85 from the input linear polarization state 120 at $2\Psi = 0$, $2\chi = 0$ to the linear state 121 at $2\Psi = +90$, $2\chi = 0$. The three succeeding arcs 135, 136 and 137 represent the further transformation of the polarization state by combination plate 86 via intermediate states 122 and 123 or 124, and circular state 125 to elliptical polarization state 126 at $2\Psi = +193.38$, $2\chi = +61.30$. The +180 degree arc 138 represents the +90 degree Faraday rotation by element 87 to the elliptical state 127 at $2\Psi = +13.38$, $2\chi = +61.30$, while the final two arcs 139 and 140 representing combination plate 88 complete the transformation via intermediate elliptical states 128 or 129 to the output plane polarization state 130 at $2\Psi = 180$, $2\chi = 0$. If the two Faraday elements together are to function as a third order circularly birefringent filter and give the desired optimum transmission at 1.31 and 1.55 $\mu$m, second combination plate 88 should be designed assuming the input state 127 to be slightly displaced to $2\Psi = +13.38$, $2\chi = +59.35$.

Combination plates 86 and 88 consist of quartz birefringent plates. Components 80, 81 and 91 have 180 degrees of retardation at 1.42 $\mu$m while 82 and 90 have 118.70 and 114.32 degrees of retardation, respectively. The two stage transformation by plate 80 with its fast axis at 36.02 degrees and by plate 81 with its fast axis at 106.49 degrees is represented by arcs 135 and 136. At the two optimized wavelengths of 1.31 and 1.55 $\mu$m they convert the polarization state 121 to intermediate polarization states 124 and 123, respectively, and as represented by arc 137 these are further transformed by plate 82 with its fast axis at 51.69 degrees to polarization state 126. Thus, combination plate 86 is equivalent to an optical rotation produced primarily by component plates 80 and 81 followed by a linear retardation produced primarily by component plate 82. Likewise at the two optimized wavelengths of 1.31 and 1.55 $\mu$m, polarization state 127 is transformed as represented by arc 139 to intermediate polarization states 129 and 128, respectively, by plate 90 with its fast axis at 71.84 degrees. Polarization states 129 and 128 are further transformed as represented by arc 140 to linear polarization state 130 by plate 91 with its fast axis at 18.61 degrees.

Double arc 135 and 136 between points 121 and 124 represents the transformations of plates 80 and 81 at the shorter wavelength while the portion between points 121 and 123 represents the transformations at the longer wavelength. Arc 137 between points 124 and 126 represents the transformations of plate 82 at the shorter wavelength, while the portion between points 123 and 126 represents the transformations at the longer wavelength. Arc 139 between points 127 and 129 represents the transformations of plate 90 at the shorter wavelength, while the portion between points 127 and 128 represents the transformations at the longer wavelength. Arc 140 between points 129 and 130 represents the transformations of plate 91 at the shorter wavelength, while the portion between points 128 and 130 represents the transformations at the longer wavelength. One design criterion for the two quasi-achromatic combination plates is therefore that the ratios of the pathlengths along each arc segment representing their transformations to the two transition points be equal to the ratio of the relative retardations at the two wavelengths at which their transformations are to be optimized.

As stated above the purpose of combination plate 86 is to transform the linear polarization state 121 at the output of Faraday rotation element 85 into an elliptical state 126 with $2\chi = +61.3$ degrees. Polarization state 121 is at $2\Psi = +90$ degrees at the nominal wavelength of 1.42 $\mu$m for which element 85 is designed but at the 1.31 and 1.55 $\mu$m wavelengths for which the forward transmission and reverse isolation are to be optimized, state 121 moves to higher and lower $2\Psi$ values. This movement of state 121 must also be transformed by combination plate 86 to a movement of state 126 while maintaining its ellipticity at $2\chi = +61.3$ degrees. It is this requirement that necessitates the use of plates 80 and 81 in the double arc transformation from polarization state 121 to intermediate states 124 and 123. Also, the requirement that combination plate 86 functions properly for both the forward direction of propagation as shown in FIGS. 11a and 11b as well as in the reverse direction as shown in FIGS. 11c and 11d necessitates that arcs 135 and 137 join arcs 134 and 138 at right angles. This is the reason arc 137 passes through the circular polarization state at point 125.

The plane polarizers at the input and output ports of the isolator of FIG. 10 require that light entering at either end must have the proper polarization state to avoid unnecessary attenuation. Light of arbitrary polarization such as that from an optical fiber can be efficiently processed by the device if it is split into two orthogonal plane polarized components so that both components can be processed in parallel. A polarizing beam splitter well suited to this task has been described in U.S. Pat. No. 4,671,613.

Figure 12A:
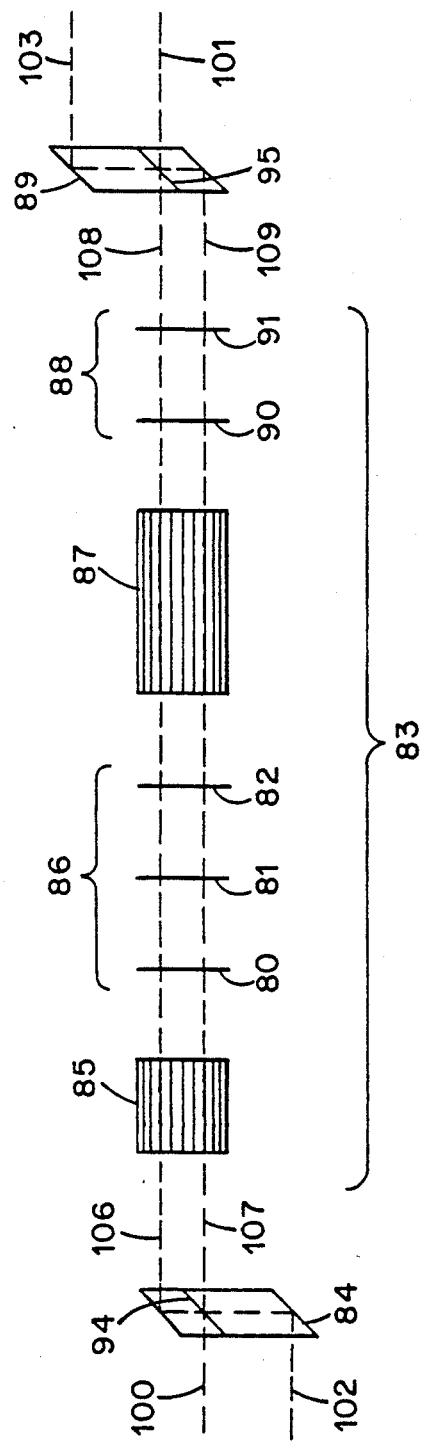
FIGS. 12a and 12b are exploded side and perspective views respectively of the preferred embodiment of a quasi-achromatic optical circulator according to the invention.
Figure 12B:
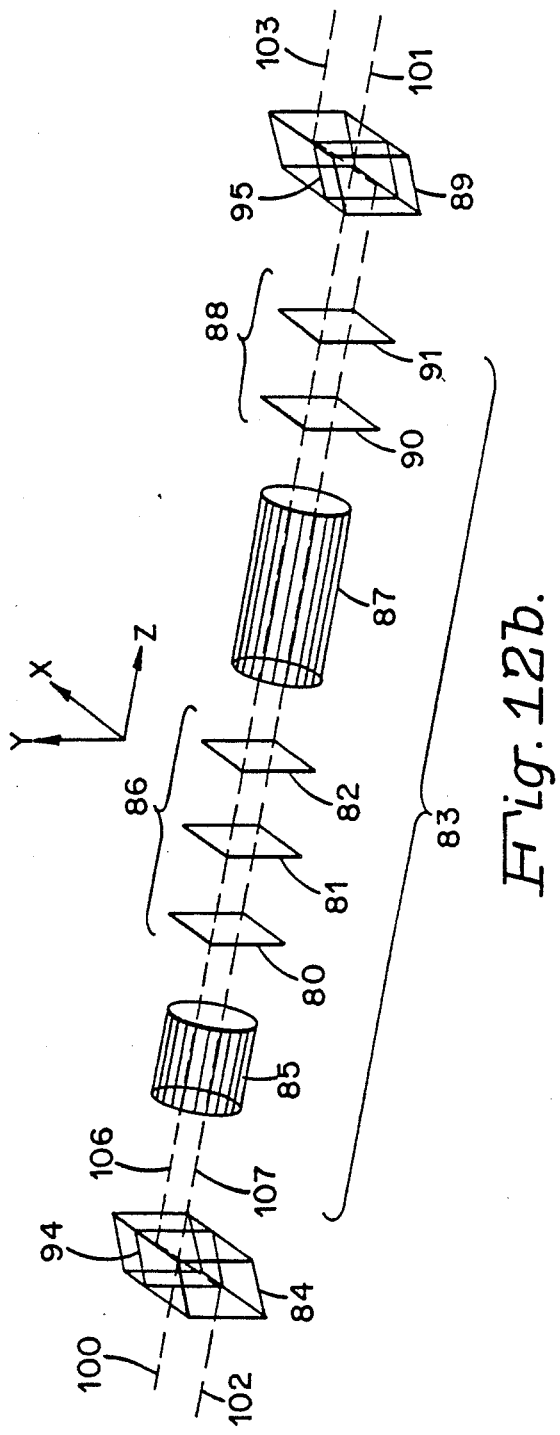

The optical circulator of FIGS. 12a and 12b results from replacing the polarizers of FIG. 10 with two polarizing beam splitters. The two glass prisms 84 and 89 each have three parallel reflecting facets, the center one being an internal interface 94 or 95 with a multilayer dielectric coating that reflects the TE wave and transmits the TM wave. The TM and TE waves are linear polarization components with their electric fields at 0 and 90 degrees, that is, along the x and y axes, respectively. Optical network 83 is designed to transform the plane of polarization from 0 to 90 or from 90 to 0 degrees for light propagating from left to right in the $+z$ forward direction, and to retain the polarization at 0 or 90 degrees for light propagating from right to left in the $-z$ reverse direction. It consists of $+45$ and $+90$ degree Faraday rotation elements 85 and 87 along with their axial field producing magnets and combination plates 86 and 88 configured as shown in FIG. 10 and as described above.

An input light beam 100 with arbitrary polarization is split into two plane polarized components at interface 94 with the transmitted TM wave 107 polarized at zero degrees and the reflected TE wave 106 polarized at 90 degrees. After passing through network 83 beam 107 has become TE polarized beam 109 and is reflected by interface 95 to output 101, while beam 106 has become TM polarized beam 108 and is transmitted by interface 95 also to output 101. Similarly, an input light beam 102 with arbitrary polarization is split into two plane polarized components 106 and 107 and after passing through network 83 will recombine to appear at output 103. Light entering the circulator as beams 101 or 103 will be split into components 108 and 109, but these will pass through network 83 in the reverse direction and appear as components 106 and 107 with unchanged polarization states. Upon recombining at interface 94, the components from beams 101 and 103 will emerge as beams 102 and 100, respectively. Thus, the device functions as a four port circulator because light beams entering ports 100, 101, 102, and 103 emerge at ports 101, 102, 103, and 100, respectively.

Figure 13A:
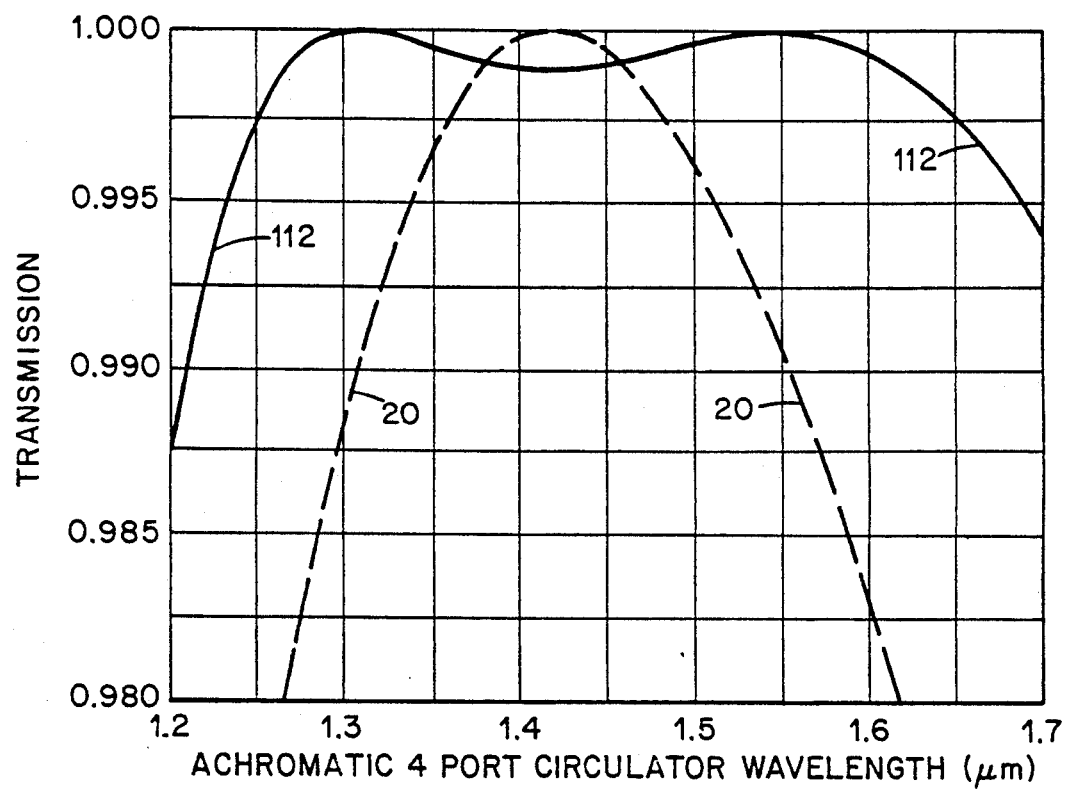
FIGS. 13a and 13b plot the forward and reverse transmission functions for the optical isolator of FIG. 10 and the optical circulator of FIGS. 12a and 12b.
Figure 13B:
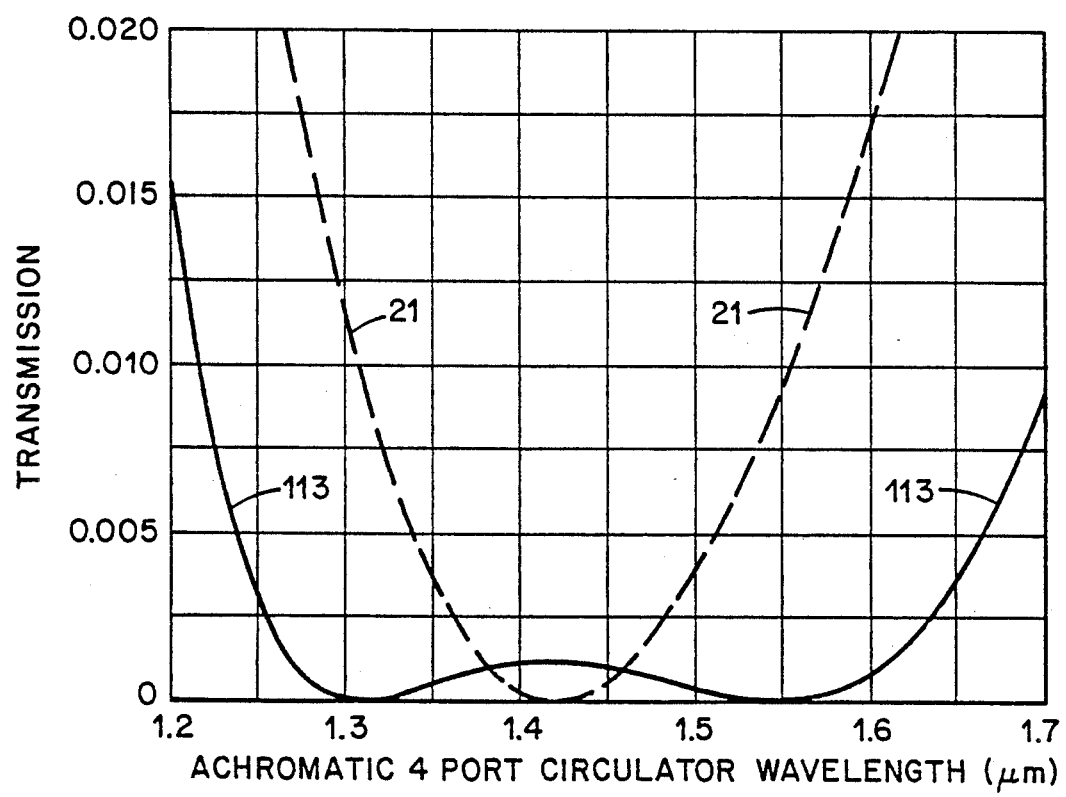

The forward and reverse transmission functions for the isolator configuration of FIG. 10 or the circulator configuration of FIG. 12 were calculated using the Jones matrix method of analysis. The forward transmission function shown as curve 112 of FIG. 13a is equal to 1.0 at both 1.31 and 1.55 $\mu$m indicating that at these optimized wavelengths there is no insertion loss for either device. The reverse transmission function shown as curve 113 of FIG. 13b is also equal to 0.0 at both 1.31 and 1.55 $\mu$m indicating that at these optimized wavelengths there is complete reverse isolation for both devices. For comparison, curves 20 and 21 for the prior art single Faraday element isolator show optimum operation only at its one nominal wavelength.

Alternate Construction

In the optical isolator of FIG. 3 birefringent plates 36 and 38 could be oriented with their fast axes at zero degrees so as to transform the linear polarization state leaving Faraday rotation element 85 to left elliptical polarization with $2\chi = -60$ degrees. The isolator of FIG. 5 could be similarly modified without changing its essential operation. Network 83 of both the isolator of FIG. 10 and the circulator of FIG. 12 can be constructed in a number of alternative ways. Component plates 80, 81, and 82 of combination plate 86 may have any one of several sets of retardation values and fast axis orientation angles to transform the linear polarization state from Faraday element 85 to elliptical with $2\chi$ approximately equal to $+60$ or $-60$ degrees, the exact value being determined by the desired splitting between the two optimal wavelengths of operation desired. Some of these transformations require Faraday element 87 to have the same polarity of rotation as that of Faraday element 85, while others required the opposite. Thus, the axial field producing magnets associated with Faraday elements 85 and 87 are oriented to give a +45 degree rotation in element 85 and a +90 or −90 degree rotation in element 87 for the forward direction of propagation as dictated by the design of combination plate 86. Component plates 90 and 91 of combination plate 88 may also have any one of several sets of retardation values and fast axis orientation angles to transform the polarization state leaving element 87 to output linearly polarized along y so as to pass through polarizer 89 of FIG. 10. Or they may have any one of several alternative sets of retardation values and fast axis orientation angles to transform the polarization state leaving element 87 to output linearly polarized along x provided that polarizer 89 is reoriented accordingly and that the output ports of the circulator of FIG. 12 are redefined.

Component plates 80, 81, and 91 are half-wave at the nominal wavelength of 1.42 μm, but the retardation values of plates 82 and 90 and all their fast axis orientations are most easily found by iteration starting from values estimated by graphical construction of the Poincare sphere. In Table II are listed sixteen configurations for network 83 all of which for the forward direction of propagation yield y polarized output for x polarized input. Each gives the two Faraday rotations with the retardation and fast axis orientation values at 1.42 μm for the five birefringent plates. The sixteen configurations all have forward and reverse transmissions of 1.0 and 0.0, respectively, at both 1.31 and 1.55 μm. Between and adjacent to these wavelengths they differ somewhat from those shown in FIGS. 13a and 13b which are for configuration number 1. Configurations 3, 4, 7, and 8 have forward and reverse transmissions between 1.31 and 1.55 μm that remain closer to 1.0 and 0.0 and should allow the construction of isolators and circulators with broadband isolations of better then 35 db between 1.28 and 1.60 μm.

The iterative procedure used to find the retardation values and fast axis orientation angles such as listed in Table I is best carried out in several steps. The polarization ellipticities $\chi$ at the input and output of Faraday element 87 are estimated as described above to give the two desired optimum wavelengths of the transmission function. Using the Jones method and the known wavelength dependence of the Faraday rotations, the transmission is then computed assuming an input plane polarizer along x. Faraday element 85, a single ideal wavelength independent retardation plate determined by the input $2\chi$ to Faraday element 87, and an output elliptical polarizer determined by the output $2\chi$ from element 87. The nominal design wavelength of the Faraday rotators and transmission peak splitting are then revised by varying the $2\chi$ values until the forward and reverse transmissions are 1.0 and 0.0 respectively, at the two desired optimum wavelengths. Next, combination plate 86 is substituted for the ideal plate. Component plates 80 and 81 are nominally half-wave, while plate 82 has a retardation of $2\chi$ or 180-$2\chi$ where $\chi$ is the required input ellipticity to element 87. The orientation of the fast axes of the three plates and the $2\Psi$ orientation of the output elliptical polarizer are again revised until the computed forward and reverse transmissions are 1.0 and 0.0, respectively, at the two desired optimum wavelengths. Finally, combination plate 88 followed by plane polarizer 89 oriented at 90 degrees along y is substituted for the output elliptical polarizer. Component plate 91 is nominally half-wave, but the retardation of plate 90 and the fast axis orientations of both component plates must be determined. Given the known polarization states 127 and 130 as determined from the above iterations and shown on the Poincare sphere of FIG. 11a, the $2\Psi$, $2\chi$ values of states 128 and 129 are calculated such that the segment lengths of arcs 139 and 140 are in the ratio of the retardation values of the plates at the two optimum wavelengths. The required retardation value and fast axis orientations are then calculated using the geometry of the Poincare sphere. Finally, the completed network 83 is analyzed using the Jones method to give the transmission functions as shown in FIGS. 13a and 13b.

TABLE I

| Ripple Amplitudes | | 0.000 | 0.001 | 0.005 | 0.010 | 0.050 |
|---|---|---|---|---|---|---|
| Fourier | $A_0$ | 0.5 | 0.5 | 0.5 | 0.5 | 0.5 |
| Components | $A_1$ | 0.5625 | 0.568555 | 0.573858 | 0.576253 | 0.571526 |
| | $A_2$ | 0.0 | 0.0 | 0.0 | 0.0 | 0.0 |
| | $A_3$ | −0.0625 | −0.069555 | −0.078858 | −0.086253 | −0.121526 |
| Peak Splitting Crystal Filter | | 0.0 | 0.0845 | 0.1237 | 0.1449 | 0.2042 |
| Relative | $\theta_1$ | −45.0 | −45.0 | −45.0 | −45.0 | −45.0 |
| Angles | $\theta_2$ | +60.0 | +58.792 | +57.297 | +56.174 | +51.386 |
| | $\theta_3$ | 0.0 | 0.0 | 0.0 | 0.0 | 0.0 |
| | $\theta_p$ | −15.0 | −15.604 | −16.352 | −16.913 | −19.307 |

TABLE II

| Network 83 Config. Number | Faraday Elem. 85 Rotation | Biref. Plate 80 | Biref. Plate 81 | Biref. Plate 82 | Faraday Elem. 87 Rotation | Biref. Plate 90 | Biref. Plate 91 |
|---|---|---|---|---|---|---|---|
| 1 | +45 | 180.00 @36.02 | 180.00 @106.49 | 118.70 @51.69 | +90 | 114.32 @71.84 | 180.00 @18.61 |
| 2 | +45 | 180.00 @126.02 | 180.00 @16.49 | 118.70 @141.69 | +90 | 114.32 @161.84 | 180.00 @108.61 |
| 3 | +45 | 180.00 @53.98 | 180.00 @163.51 | 118.70 @38.31 | +90 | 94.40 @177.04 | 180.00 @103.60 |
| 4 | +45 | 180.00 @143.98 | 180.00 @73.51 | 118.70 @128.31 | +90 | 94.40 @87.04 | 180.00 @13.60 |
| 5 | +45 | 180.00 @36.02 | 180.00 @106.49 | 118.70 @51.69 | +90 | 108.89 @24.32 | 180.00 @73.14 |
| 6 | +45 | 180.00 @126.02 | 180.00 @16.49 | 118.70 @141.69 | +90 | 108.89 @114.32 | 180.00 @163.14 |
| 7 | +45 | 180.00 @53.98 | 180.00 @163.51 | 118.70 @38.31 | +90 | 69.86 @102.43 | 180.00 @169.45 |

TABLE II-continued

| Network 83 Config. Number | Faraday Elem. 85 Rotation | Biref. Plate 80 | Biref. Plate 81 | Biref. Plate 82 | Faraday Elem. 87 Rotation | Biref. Plate 90 | Biref. Plate 91 |
|---|---|---|---|---|---|---|---|
| 8 | +45 | 180.00 @143.98 | 180.00 @73.51 | 118.70 @128.31 | +90 | 69.86 @12.43 | 180.00 @79.45 |
| 9 | +45 | 180.00 @39.47 | 180.00 @119.48 | 61.30 @70.43 | −90 | 115.54 @178.57 | 180.00 @70.95 |
| 10 | +45 | 180.00 @129.47 | 180.00 @29.48 | 61.30 @160.43 | −90 | 115.54 @88.57 | 180.00 @160.95 |
| 11 | +45 | 180.00 @50.53 | 180.00 @150.52 | 61.30 @19.57 | −90 | 119.13 @99.62 | 180.00 @159.46 |
| 12 | +45 | 180.00 @140.53 | 180.00 @60.52 | 61.30 @109.57 | −90 | 119.13 @9.62 | 180.00 @69.46 |
| 13 | +45 | 180.00 @39.47 | 180.00 @119.48 | 61.30 @70.43 | −90 | 61.59 @58.39 | 180.00 @9.88 |
| 14 | +45 | 180.00 @129.47 | 180.00 @29.48 | 61.30 @160.43 | −90 | 61.59 @148.39 | 180.00 @99.88 |
| 15 | +45 | 180.00 @50.53 | 180.00 @150.52 | 61.30 @19.57 | −90 | 97.77 @147.91 | 180.00 @104.22 |
| 16 | +45 | 180.00 @140.53 | 180.00 @60.52 | 61.30 @109.57 | −90 | 97.77 @57.91 | 180.00 @14.22 |

What is claimed is:

1. A quasi-achromatic optical isolator having first and second ports between which a light beam may propagate, comprising:
   a first plane polarizer adjacent said first port of said isolator;
   two or more nonreciprocal optical rotators;
   two or more linearly birefringent plates; and
   a second plane polarizer adjacent said second port of said isolator;
   said nonreciprocal optical rotators and said linearly birefringent plates being positioned in alternating sequence between said first and second plane polarizers.

2. The optical isolator of claim 1 wherein said nonreciprocal optical rotators have a rotation angle of 45 degrees or an integral multiple thereof at a nominal center wavelength and at a nominal operating temperature.

3. The optical isolator of claim 2 wherein over a wavelength range about said nominal center wavelength:
   a light beam entering said first port is unattenuated by said second polarizer upon exiting said second port; and
   a light beam entering said second port is strongly attenuated by said first polarizer upon exiting through said first port.

4. The optical isolator of claim 1 wherein said nonreciprocal optical rotators are Faraday rotators composed of the same material such that they have exactly proportional wavelength and temperature dependencies, thereby compensating for wavelength changes and temperature variations.

5. A quasi-achromatic optical isolator through which a light beam within a wavelength range about a nominal wavelength may propagate along a +z coordinate axis comprising:
   a first plane polarizer accepting said light beam at a first port and transmitting said light beam polarized along an orthogonal x coordinate axis;
   a first Faraday rotator receiving said light beam which has passed through said first plane polarizer;
   a first linearly birefringent plate oriented with its fast axis along the x axis and receiving said light beam which has passed through said first Faraday rotator;
   a second Faraday rotator receiving said light beam which has passed through said first linearly birefringent plate;
   a second linearly birefringent plate oriented with its fast axis along the x axis and receiving said light beam which has passed through said second Faraday rotator;
   a second plane polarizer receiving the light beam which has passed through said second linearly birefringent plate, transmitting said light beam undiminished in intensity, and exiting said light beam at a second port.

6. The optical isolator of claim 5 wherein:
   said first Faraday rotator has a rotation angle of +n degrees; and
   said second Faraday rotator has a rotation angle of +2n degrees.

7. The optical isolator of claim 6 wherein said first and said second linearly birefringent plates have +120 degrees of retardation.

8. The optical isolator of claim 6 wherein said first and said second linearly birefringent plates have −120 degrees of retardation.

9. The optical isolator of claim 5 wherein:
   said first Faraday rotator has a rotation angle of +n degrees; and
   said second Faraday rotator has a rotation angle of −2n degrees.

10. The optical isolator of claim 9 wherein said first and said second linearly birefringent plates have +60 degrees of retardation.

11. The optical isolator of claim 9 wherein said first and said second linearly birefringent plates have −60 degrees of retardation.

12. The optical isolator of claim 6 or 9 wherein:
   n = +45 degrees at said nominal wavelength; and
   the orientation of the polarization axis of said second plane polarizer is equal to −45 degrees.

13. The optical isolator of claim 6 or 9 wherein:
   n = −45 degrees at said nominal wavelength; and
   the orientation of the polarization axis of said second plane polarizer is equal to +45 degrees.

14. The optical isolator of claim 5 wherein said Faraday rotators are composed of the same material such that they have exactly proportional wavelength and temperature dependencies, thereby compensating for wavelength changes and temperature variations.

15. The optical isolator of claim 14 wherein the Faraday rotators comprise crystals of yttrium iron garnet.

16. The optical isolator of claim 5 wherein said birefringent plates are constructed for said nominal wavelength equal to 1.42 microns.

17. A quasi-achromatic optical isolator through which a light beam within a wavelength range about a nominal wavelength may propagate along a +z coordinate axis comprising:
   a first plane polarizer accepting said light beam at a first port and transmitting said light beam polarized along an orthogonal x coordinate axis;
   a first Faraday rotator receiving the light beam which has passed through said first plane polarizer;
   a first plurality of linearly birefringent plates receiving the light beam which has passed through said first Faraday rotator;
   a second Faraday rotator receiving the light beam which has passed through said first plurality of linearly birefringent plates;
   a second plurality of linearly birefringent plates receiving the light beam which has passed through the second Faraday rotator;
   a second plane polarizer receiving the light beam which has passed through said second plurality of linearly birefringent plates, transmitting said light beam undiminished in intensity, and exiting said light beam at a second port.

18. The optical isolator of claim 17 wherein:
   said first Faraday rotator has a rotation angle of +n degrees; and
   said second Faraday rotator has a rotation angle of +2n degrees.

19. The optical isolator of claim 18 wherein said first plurality of linearly birefringent plates constitutes a combination plate quasi-achromatic about said nominal wavelength and equivalent to an optical rotator followed by a linear retardation between +116 and +120 degrees.

20. The optical isolator of claim 18 wherein said first plurality of linearly birefringent plates constitutes a combination plate quasi-achromatic about said nominal wavelength and equivalent to an optical rotator followed by a linear retardation between −116 and −120 degrees.

21. The optical isolator of claim 17 wherein:
   said first Faraday rotator has a rotation angle of +n degrees: and
   said second Faraday rotator has a rotation angle of −2n degrees.

22. The optical isolator of claim 21 wherein said first plurality of linearly birefringent plates constitutes a combination plate quasi-achromatic about said nominal wavelength and equivalent to an optical rotator followed by a linear retardation between +60 and +64 degrees.

23. The optical isolator of claim 21 wherein said first plurality of linearly birefringent plates constitutes a combination plate quasi-achromatic about said nominal wavelength and equivalent to an optical rotator followed by a linear retardation between −60 and −64 degrees.

24. The optical isolator of claim 18 or 21 wherein n= +45 degrees at said nominal wavelength.

25. The optical isolator of claim 18 or 21 wherein n= −45 degrees at said nominal wavelength.

26. The optical isolator of claim 18 or 21 wherein the orientation of the polarization axis of said second plane polarizer is equal to 90 degrees.

27. The optical isolator of claim 18 or 21 wherein the orientation of the polarization axis of said second plane polarizer is equal to zero degrees.

28. The optical isolator of claim 17 wherein the transmission in the forward direction from said first port to said second port and the isolation in the reverse direction from said second port to said first port are optimized at two wavelengths oppositely displaced from said nominal wavelength.

29. The optical isolator of claim 17 wherein said second plurality of linearly birefringent plates constitutes a combination plate quasi-achromatic about said nominal wavelength for converting elliptically polarized light from said second Faraday rotator to plane polarized light for transmission by said second polarizer.

30. The optical isolator of claim 17 wherein said Faraday rotators are composed of the same material such that they have exactly proportional wavelength and temperature dependencies, thereby compensating for wavelength changes and temperature variations.

31. A quasi-achromatic optical circulator having first, second, third, and fourth ports comprising:
   a first polarizing beam splitter adjacent said first and said third ports of said circulator;
   two or more nonreciprocal optical rotators;
   two or more linearly birefringent plates;
   a second polarizing beam splitter adjacent said second and said fourth ports of said circulator; and
   said nonreciprocal optical rotators and said linearly birefringent plates being positioned in alternating sequence between said first and second polarizing beam splitters;
   whereby light entering said first port is directed to said second port;
   light entering said second port is directed to said third port;
   light entering said third port is directed to said fourth port; and
   light entering said fourth port is directed to said first port.

32. The optical circulator of claim 31 wherein said nonreciprocal optical rotators are Faraday rotators having a rotation angle of 45 degrees or an integral multiple thereof at a nominal center wavelength and at a nominal operating temperature.

33. A quasi-achromatic optical circulator having first, second, third, and fourth ports that may accept a light beam within a wavelength range about a nominal wavelength and direct it to a succeeding port and comprising:
   a first polarizing beam splitter adjacent said first and said third ports of said circulator;
   a first Faraday rotator receiving a light beam which has passed through said first polarizing beam splitter;
   a first plurality of linearly birefringent plates receiving the light beam which has passed through said first Faraday rotator:
   a second Faraday rotator receiving the light beam which has passed through said first plurality of linearly birefringent plates;
   a second plurality of linearly birefringent plates receiving the light beam which has passed through said second Faraday rotator: and a second polarizing beam splitter adjacent said second and said fourth ports of said circulator for receiving the light beam which has passed through said second plurality of linearly birefringent plates and directing said light beam undiminished in intensity to said succeeding port.

34. The optical circulator of claim 33 wherein the orientations of the polarization axes of said first polarizing beam splitter are equal to 0 and 90 degrees.

35. The optical circulator of claim 36 wherein:
said first Faraday rotator has a rotation angle of +n degrees; and
said second Faraday rotator has a rotation angle of +2n degrees.

36. The optical circulator of claim 35 wherein said first plurality of linearly birefringent plates constitutes a combination plate quasi-achromatic about said nominal wavelength and equivalent to an optical rotator followed by a linear retardation between +116 and +120 degrees.

37. The optical circulator of claim 35 wherein said first plurality of linearly birefringent plates constitutes a combination plate quasi-achromatic about said nominal wavelength and equivalent to an optical rotator followed by a linear retardation between −116 and −120 degrees.

38. The optical circulator of claim 34 wherein:
said first Faraday rotator has a rotation angle of +n degrees; and
said second Faraday rotator has a rotation angle of −2n degrees.

39. The optical circulator of claim 38 wherein said first plurality of linearly birefringent plates constitutes a combination plate quasi-achromatic about said nominal wavelength and equivalent to an optical rotator followed by a linear retardation between +60 and +64 degrees.

40. The optical circulator of claim 38 wherein said first plurality of linearly birefringent plates constitutes a combination plate quasi-achromatic about said nominal wavelength and equivalent to an optical rotator followed by a linear retardation between −60 and −64 degrees.

41. The optical circulator of claim 35 or 38 wherein n= +45 degrees at said nominal wavelength.

42. The optical circulator of claim 35 or 38 wherein n= −45 degrees at said nominal wavelength.

43. The optical circulator of claim 34 wherein the orientations of the polarization axes of said second polarizing beam splitter are equal to 0 and 90 degrees.

44. The optical circulator of claim 33 wherein the transmission in the forward direction between succeeding ports and the isolations between non succeeding ports are optimized at two wavelengths symmetrically displaced from said nominal wavelength.

45. The optical circulator of claim 33 wherein said second plurality of linearly birefringent plates constitutes a combination plate quasi-achromatic about said nominal wavelength for converting elliptically polarized light from said second Faraday rotator to plane polarized light for transmission by said second polarizer.

* * * * *